US007347318B2

(12) United States Patent
Kato

(10) Patent No.: US 7,347,318 B2
(45) Date of Patent: Mar. 25, 2008

(54) IMAGE FORMING DEVICE

(75) Inventor: Atsushi Kato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/476,800

(22) Filed: Jun. 29, 2006

(65) Prior Publication Data

US 2007/0009310 A1 Jan. 11, 2007

(30) Foreign Application Priority Data

Jun. 29, 2005 (JP) ............................ 2005-189745

(51) Int. Cl.
*B65G 23/44* (2006.01)

(52) U.S. Cl. ...................................... 198/814; 399/116

(58) Field of Classification Search ........... 198/810.04, 198/813, 814; 399/116, 165
See application file for complete search history.

(56) References Cited

U.S. PATENT DOCUMENTS 4,634,264 A * 1/1987 Takahashi ................... 399/116
5,285,816 A * 2/1994 Herlihy ...................... 137/856
5,585,892 A * 12/1996 Hayano et al. ............. 399/164
5,991,575 A * 11/1999 Okiyama et al. ........... 198/806
6,181,900 B1 1/2001 Lee et al.
6,185,394 B1 2/2001 Lee
6,249,662 B1 6/2001 Lee
6,445,895 B2 9/2002 Shirasawa et al.

FOREIGN PATENT DOCUMENTS

JP 2000047528 2/2000
JP 2000172122 6/2000
JP 2000172123 6/2000
JP 2000206803 7/2000
JP 2000284637 10/2000
JP 2000284638 10/2000
JP 2001209294 8/2001
JP 2005017482 1/2005

* cited by examiner

*Primary Examiner*—James R. Bidwell
(74) *Attorney, Agent, or Firm*—Banner & Witcoff, Ltd.

(57) ABSTRACT

An image forming device includes: a main unit; an image bearing body; a belt unit; and a tension-applying mechanism. The belt unit is detachably mounted in the main unit and has a pair of supporting rollers supporting an endless belt thereon. The endless belt has an inner circumference side that confronts the pair of supporting rollers and an outer circumference side opposite to the inner circumference side. The outer circumference side of a part of the endless belt defined between the pair of supporting rollers along an arrangement direction, in which the pair of supporting rollers are arranged, confronts the image bearing body when the belt unit is mounted in the main unit. The tension-applying mechanism is provided in the main unit. When the belt unit is mounted in the main unit, the tension-applying mechanism urges one supporting roller among the pair of supporting rollers in a direction of separating the one supporting roller away from the other supporting roller, thereby applying tension to the endless belt.

10 Claims, 17 Drawing Sheets

IMAGE FORMING DEVICE

CROSS REFERENCE TO RELATED APPLICATION

This application claims priority from Japanese Patent Application No. 2005-189745 filed Jun. 29, 2005, the entire content of which is incorporated herein by reference.

TECHNICAL FIELD

The disclosure relates to an image forming device, in which a belt unit is detachably mounted.

BACKGROUND

U.S. Pat. No. 6,445,895B2 discloses an image forming device in which a detachable guide pin is provided at a side face of belt cartridge (belt unit). A detachable guide groove for guiding the detachable guide pin and a belt tension-applying mechanism including a tension link and a spring are provided at the main unit body of the image forming device. With this configuration, when the belt cartridge is attached to the image forming device main unit along the detachable guide groove, the belt tension-applying mechanism engages with a rotating shaft of a tension roller in the belt unit, thereby applying predetermined tension or tensile force to a belt.

SUMMARY

With the configuration of the above-mentioned patent document, the belt is supported by a driving roller and a follow roller and the tension roller. The driving roller and a follow roller are arranged in an alignment direction of four developing units, and the tension roller is arranged further away from the developing units than the driving roller and the follow roller. The tension roller is urged to further separate from the developing units, thereby applying tension to the belt. With such configuration, the developing units are provided as opposed to a belt part defined between the driving roller and the follow roller. Accordingly, even when the tension roller is displaced, the position of the belt part is not changed relative to the function components.

On the contrary, other belt parts that are defined between the tension roller and the driving roller and between the tension roller and the follow roller are displaced in response to the displacement of the tension roller. It is therefore undesirable to provide the developing units, a belt cleaning mechanism, or other devices at locations that confront those other belt parts.

In view of the foregoing, it is an object of the invention is to provide an improved image forming device that is capable of preventing, when a belt unit is accommodated in the main body of the image forming device, a tensioned endless belt from moving relative to a device provided on an outer circumference side of the endless belt as much as possible.

In order to attain the above and other objects, the invention provides an image forming device, including: a main unit; an image bearing body; a belt unit; and a tension-applying mechanism. The image bearing body bears a developer image thereon and is provided in the main unit. The belt unit is detachably mounted in the main unit and has a pair of supporting rollers supporting an endless belt thereon. The endless belt has an inner circumference side that confronts the pair of supporting rollers and an outer circumference side opposite to the inner circumference side. The outer circumference side of a part of the endless belt defined between the pair of supporting rollers along an arrangement direction, in which the pair of supporting rollers are arranged, confronts the image bearing body when the belt unit is mounted in the main unit. The tension-applying mechanism is provided in the main unit. When the belt unit is mounted in the main unit, the tension-applying mechanism urges one supporting roller among the pair of supporting rollers in a direction of separating the one supporting roller away from the other supporting roller, thereby applying tension to the endless belt.

According to another aspect, the invention provides an image forming device, including: a main unit; an image bearing body; a belt unit; and a tension-applying mechanism. The image bearing body bears a developer image thereon and is provided in the main unit. The belt unit is detachably mounted in the main unit and has a first supporting roller, a second supporting roller, and at least one third supporting roller supporting an endless belt thereon. The at least one third supporting roller is located at a position that is separate from an imaginary plane, on which the first and second supporting rollers are located, in a direction perpendicular to the imaginary plane. The endless belt has an inner circumference side that confronts the first supporting roller, the second supporting roller, and the at least one third supporting roller and an outer circumference side opposite to the inner circumference side. The outer circumference side of a part of the endless belt defined between the first supporting roller and the second supporting roller along an arrangement direction, in which the first supporting roller and the second supporting roller are arranged, confronts the image bearing body when the belt unit is mounted in the main unit. The tension-applying mechanism is provided in the main unit. When the belt unit is mounted in the main unit, the tension-applying mechanism urges one supporting roller among the first supporting roller and the second supporting roller in a direction of separating the one supporting roller away from the other supporting roller among the first supporting roller and the second supporting roller, thereby applying tension to the endless belt.

According to another aspect, the invention provides an image forming device, including: a main unit; a belt unit; and an engaging member. The belt unit is detachably mounted in the main unit and has a plurality of supporting rollers supporting an endless belt thereon. The endless belt has an inner circumference side that confronts the pair of supporting rollers. The belt unit further has an engagement part and a spring member. The spring member is connected to one supporting roller among the plurality of supporting rollers at its one end and is connected to the engagement part at its other end. The engaging member is provided in the main unit and engages with the engagement part and presses the one supporting roller onto the inner circumference side of the endless belt via the spring member when the belt unit is mounted in the main unit.

According to another aspect, the invention provides a belt unit detachably mountable in an image forming device, the belt unit including: a frame; a plurality of supporting rollers; a spring member; and an engagement part. The frame is configured so as to be capable of being detachably mounted in a main unit of an image forming device. The plurality of supporting rollers supports an endless belt thereon. The endless belt has an inner circumference side that confronts the pair of supporting rollers. The spring member is connected to one supporting roller among the plurality of supporting rollers at its one end. The engagement part is connected to the other end of the spring member. The engagement part is configured to engage with an engaging member provided in the main unit of the image forming device and to press the one supporting roller onto the inner circumference side of the endless belt via the spring member when the belt unit is mounted in the main unit of the image forming device.

BRIEF DESCRIPTION OF THE DRAWINGS

Illustrative aspects in accordance with the invention will be described in detail with reference to the following figures wherein.

DETAILED DESCRIPTION

Figure 1:
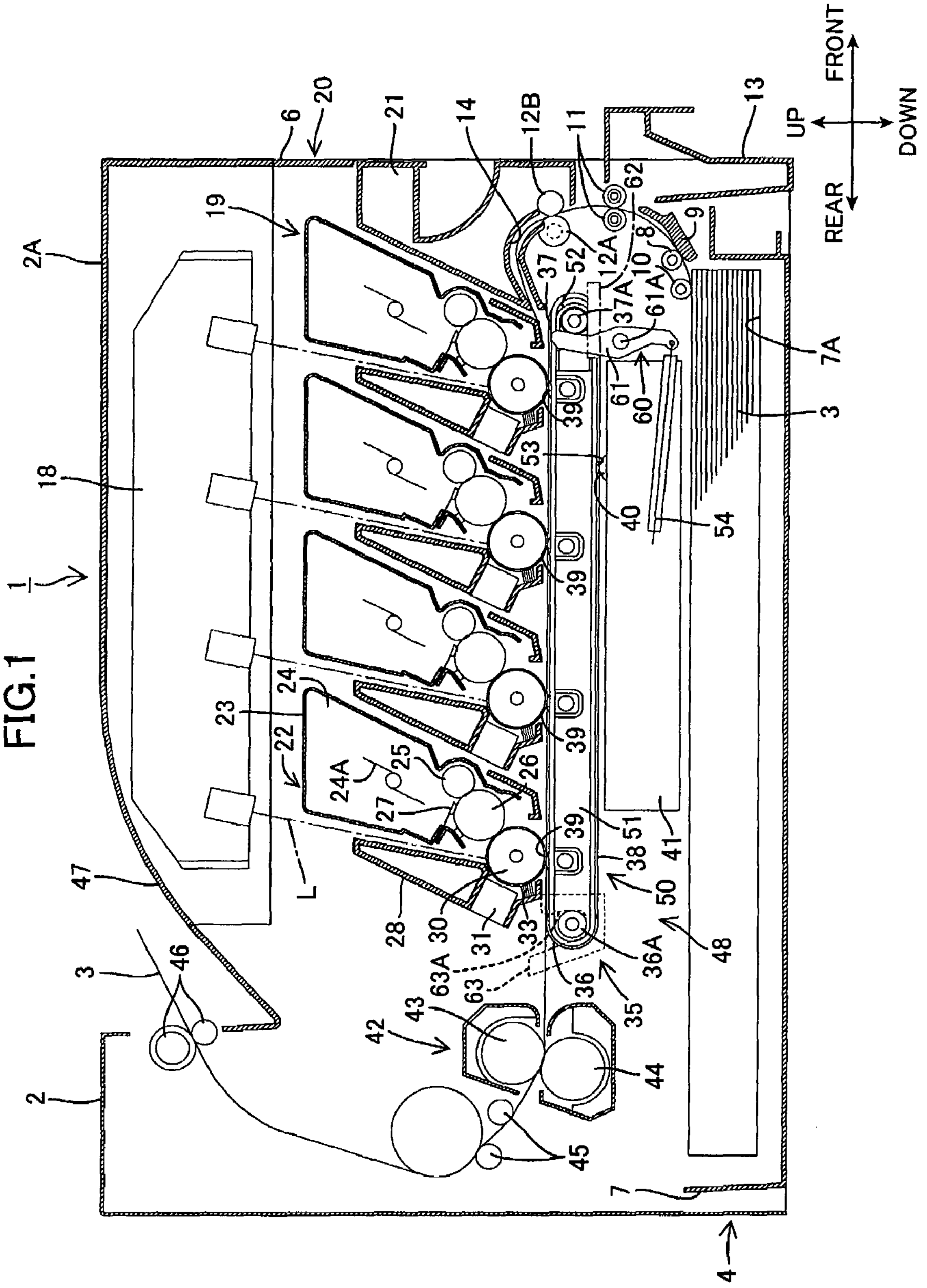
FIG. 1 is a side cross-sectional view of a laser printer according to a first embodiment.

An image forming device according to some aspects of the invention will be described while referring to the accompanying drawings wherein like parts and components are designated by the same reference numerals to avoid duplicating description.

First Embodiment

A first embodiment of the invention will be described with reference to FIG. 1 through FIG. 10B.

1. General Structure of a Laser Printer

FIG. 1 is a side cross-sectional view showing the structure of a laser printer 1 according to the first embodiment.

The terms "upward", "downward", "upper", "lower", "above", "below", "beneath", "right", "left", "front", "rear" and the like will be used throughout the description assuming that the laser printer 1 is disposed in an orientation in which it is intended to be used. In use, the laser printer 1 is disposed as shown in FIG. 1.

The laser printer 1 is a direct tandem type color laser printer having four photosensitive drums 30 corresponding to the colors black, cyan, magenta, and yellow, for example. The laser printer 1 includes a main casing 2 and, within the main casing 2, a paper supply unit 4 for supplying a paper 3, a scanning unit 18 for exposing the photosensitive drums 30, an image-forming unit 20 for forming images on the paper 3 supplied from the paper supply unit 4, and a paper-conveying unit 35 for conveying the paper 3 to the image-forming unit 20.

(1) Paper Supply Unit

The paper supply unit 4 includes a paper tray 7 detachably mounted in a lower section of the main casing 2; a feeding roller 8 and separating pad 9 disposed above a front end of the paper tray 7; a pickup roller 10 disposed on the rear side of the feeding roller 8; a pair of paper dust rollers 11 disposed above and forward of the feeding roller 8; and a pair of registration rollers 12A and 12B disposed above the paper dust rollers 11.

The paper tray 7 has a thin plate shape and is formed to accommodate sheets of the paper 3 stacked therein. The paper tray 7 has a front wall 13 provided on the front end thereof. The front wall 13 is positioned below a front cover 6 provided on the front surface of the main casing 2. The paper tray 7 can be pulled horizontally through the front of the main casing 2 by pulling forward on the front wall 13. A paper-pressing plate 7A is provided on the bottom surface of the paper tray 7 for supporting the paper 3 in a stacked formation. The paper-pressing plate 7A is rotatably supported on the bottom surface of the paper tray 7 at the rear end thereof. A spring (not shown) is disposed beneath the front end of the paper-pressing plate 7A for urging the paper-pressing plate 7A upward so that a front edge of the paper 3 stacked in the paper tray 7 is urged upward.

Through the urging force of the paper-pressing plate 7A, the topmost sheet of paper 3 stacked in the paper tray 7 is pressed against the pickup roller 10. By rotating, the pickup roller 10 begins conveying the paper :3 until the leading edge of the paper 3 becomes interposed between the feeding roller 8 and separating pad 9. As the feeding roller 8 rotates, the paper 3 becomes interposed between the feeding roller 8 and separating pad 9 and is separated and conveyed one sheet at a time. Each sheet of paper 3 is conveyed by the feeding roller 8 toward the registration rollers 12A and 12B while the paper dust rollers 11 remove paper dust from the paper 3.

The registration rollers 12A and 12B are configured of a drive roller 12A and a follow roller 12B. After correcting the registration of the paper 3, the registration rollers 12A and 12B convey the paper 3 along a paper-conveying path 14 formed in a U-shape to flip the sheet of paper 3 over and convey the sheet in a front-to-rear direction onto a transfer belt 38 of the paper-conveying unit 35 described later.

(2) Scanning Unit

The scanning unit 18 is disposed in an upper section of the main casing 2. The scanning unit 18 irradiates laser beams L for each color onto the surfaces of the corresponding photosensitive drums 30 (described later) in a high-speed scan based on prescribed image data. The four laser beams L corresponding to the four colors are irradiated obliquely downward and rearward from the bottom surface of the scanning unit 18 and follow optical paths formed parallel to each other and spaced at regular intervals in the front-to-rear direction.

(3) Image-Forming Unit

An accommodating section 19 is provided inside the main casing 2 below the scanning unit 18 for detachably accommodating the image-forming unit 20. The accommodating section 19 includes a frame 21 for detachably supporting the image-forming unit 20. The image-forming unit 20 includes a holder frame 28 for supporting four each of the photosensitive drums 30, Scorotron chargers 31, developer cartridges 22, and cleaning brushes 33 corresponding to the four colors black, cyan, magenta, and yellow. Since the structure of these components is identical for each color, reference numerals have only been given for components of the color on the most rear side. The image-forming unit 20 is properly mounted in the main casing 2, with the holder frame 28 of the image-forming unit 20 being properly mounted in the frame 21 of the main casing 2.

The developer cartridges 22 are detachably mounted in the holder frame 28 and correspond to the colors black, cyan, magenta, and yellow. Each developer cartridge 22 is configured of an accommodating case 23 having a box shape with an open bottom side. A toner-accommodating chamber 24 is formed in the top portion of the accommodating case 23 and is filled with a positively charged, nonmagnetic, single-component toner for each respective color. An agitator 24A is provided inside the toner-accommodating chamber 24. The agitator 24A can be driven to rotate by a driving force inputted from a motor (not shown), thereby agitating the toner in the toner-accommodating chamber 24. Below the toner-accommodating chamber 24, the accommodating case 23 also accommodates a supply roller 25, a developing roller 26, and a thickness-regulating blade 27.

The supply roller 25 is rotatably supported in the accommodating case 23 of the developer cartridge 22 and includes a metal roller shaft covered by a roller formed of an electrically conductive foam material. The supply roller 25 is driven to rotate by a driving force inputted from a motor (not shown).

The developing roller 26 is rotatably supported in the accommodating case 23 diagonally below and rearward of the supply roller 25 and contacts the supply roller 25 with pressure so that both are compressed. The developing roller 26 is placed in contact with the photosensitive drum 30 when the developer cartridge 22 is mounted in the holder frame 28. The developing roller 26 includes a metal roller shaft covered by a main roller body formed of an electrically conductive urethane rubber or silicone rubber containing fine carbon particles or the like. The surface of the main roller body is coated with a layer of urethane rubber or silicone rubber containing fluorine. The developing roller 26 is driven to rotate by a driving force inputted from a motor (not shown). A developing bias is applied to the developing roller 26 during a developing operation.

The thickness-regulating blade 27 includes a main blade member formed of a metal leaf spring member, and a pressing part provided on a distal end of the main blade member. The pressing part is formed of an insulating silicone rubber and has a semicircular cross section. The thickness-regulating blade 27 is supported on the accommodating case 23 above the developing roller 26 so that the pressing part is pressed against the developing roller 26 by the elastic force of the main blade member.

During a developing operation, toner discharged from the toner-accommodating chamber 24 is supplied onto the developing roller 26 by the rotation of the supply roller 25. At this time, the toner is positively tribocharged between the supply roller 25 and developing roller 26. As the developing roller 26 continues to rotate, the toner supplied onto the developing roller 26 passes beneath the thickness-regulating blade 27, which further tribocharges the toner and forms a thin layer of uniform thickness on the developing roller 26.

The photosensitive drum 30 is cylindrical in shape and is configured of a metal main drum body that is grounded and has a positive charging photosensitive layer formed of polycarbonate or the like on its outer surface. The photosensitive drum 30 is rotatably provided around a metal drum shaft penetrating the axial center of the main drum body and extending in the axial direction thereof. The drum shaft is supported on the holder frame 28. The photosensitive drum 30 is driven to rotate by a driving force inputted from a motor (not shown).

The charger 31 is disposed diagonally above and rearward of the photosensitive drum 30. The charger 31 opposes the photosensitive drum 30 but is separated a prescribed distance therefrom. The charger 31 is a positive charging Scorotron type charger that produces a corona discharge from a charging wire formed of tungsten or the like in order to form a uniform charge of positive polarity over the surface of the photosensitive drum 30.

The cleaning brush 33 is disposed in opposition to the rear side of the photosensitive drum 30 and in contact with the same.

As the photosensitive drum 30 rotates, the charger 31 charges the surface of the photosensitive drum 30 with a uniform positive charge of +900 V, for example. Subsequently, a laser beam emitted from the scanning unit 18 is scanned at a high speed over the surface of the photosensitive drum 30, forming an electrostatic latent image corresponding to an image to be formed on the paper 3 by selectively changing the surface potential on portions of the surface to +100 V, for example.

Next, toner that is carried on the surface of the developing roller 26, which is applied with a developing bias of +450 V, for example, relative to the photosensitive drum 30, comes into contact with the photosensitive drum 30 as the developing roller 26 rotates and is supplied to the electrostatic latent image formed on the surface of the photosensitive drum 30. In this way, the latent image on the photosensitive drum 30 is developed into a visible image according to a reverse developing process so that a toner image is carried on the surface of the photosensitive drum 30.

Subsequently, as the transfer belt 38 described later conveys a sheet of paper 3 through a transfer position between the photosensitive drum 30 and a transfer roller 39, the toner image carried on the surface of the photosensitive drum 30 is transferred onto the paper 3 by a negative transfer bias (−700 V, for example) applied to the transfer roller 39. After the toner image is transferred, the paper 3 is conveyed to a fixing unit 42 described later.

(4) Paper-Conveying Unit

The paper-conveying unit 35 is disposed below the image-forming unit 20 mounted in the accommodating section 19. More specifically, the main casing 2 has a belt unit storing part 48 that is located vertically between the image forming unit storing part 19 and the paper tray 7. The paper-conveying unit 35 includes a belt unit 50 which is detachably mounted in the belt unit storing part 48. The belt unit 50 includes a frame 51, a pair of belt supporting rollers 36 and 37 rotatably supported on the frame 51 as being arranged parallel to each other and separate from each other in the front-to-rear direction, and the transfer belt 38 looped around the belt supporting rollers 36 and 37. The support roller 36 disposed on the rear side is driven to rotate by a motor (not shown) so that the transfer belt 38 moves circularly in the counterclockwise direction in FIG. 1. The transfer belt 38 is an endless belt and has a width dimension no less than the width dimension of the maximum paper size that can be printed on the laser printer 1 (an A4-size paper in this example).

Four of the transfer rollers 39 are rotatably supported on the frame 51 as being disposed at regular intervals in the front-to-rear direction inside the loop of the transfer belt 38 at positions opposing the respective photosensitive drums 30 in the image-forming unit 20 described above so that the transfer belt 38 is interposed between the photosensitive drums 30 and the corresponding transfer rollers 39.

A belt-cleaning unit 41 is disposed below the belt unit 50. The belt-cleaning unit 41 has a cleaning roller 40 for cleaning residual toner deposited on the transfer belt 38. A backup roller 53 is rotatably supported on the frame 51 as being disposed inside the loop of the transfer belt 38 and is pressed to the cleaning roller 40 across the transfer belt 38.

When conveyed by the registration rollers 12A and 12B, the paper 3 passes through the paper-conveying path 14 and contacts the top surface of the transfer belt 38 near the front end thereof. The paper 3 is electrostatically attracted to the top surface of the transfer belt 38 and is conveyed rearward as the transfer belt 38 moves circularly. As the transfer belt 38 conveys the paper 3 thereon, toner of the respective colors is sequentially transferred on the paper 3 at the transfer positions between the photosensitive drums 30 and the transfer rollers 39 and superposed on one another, finally forming a four-color toner image on the paper 3.

(5) Fixing Unit

The fixing unit 42 is provided in the main casing 2 rearward of the paper-conveying unit 35. The fixing unit 42 includes a heating roller 43 and a pressure roller 44 disposed in confrontation with each other for fixing a toner image transferred onto the paper 3 with heat. Conveying rollers 45 disposed diagonally above and rearward of the fixing unit 42 receive the paper 3 after the toner image has been fixed thereon. The conveying rollers 45 convey the paper 3 toward a pair of discharge rollers 46 disposed near the top of the main casing 2. A discharge tray 47 substantially level on the front side and sloping downward toward the rear side is formed on the top surface of the main casing 2. After the conveying rollers 45 convey the paper 3 to the discharge rollers 46, the discharge rollers 46 discharge the paper 3 onto the discharge tray 47.

2. Belt Unit and Tension-Applying Mechanism

Figure 2:
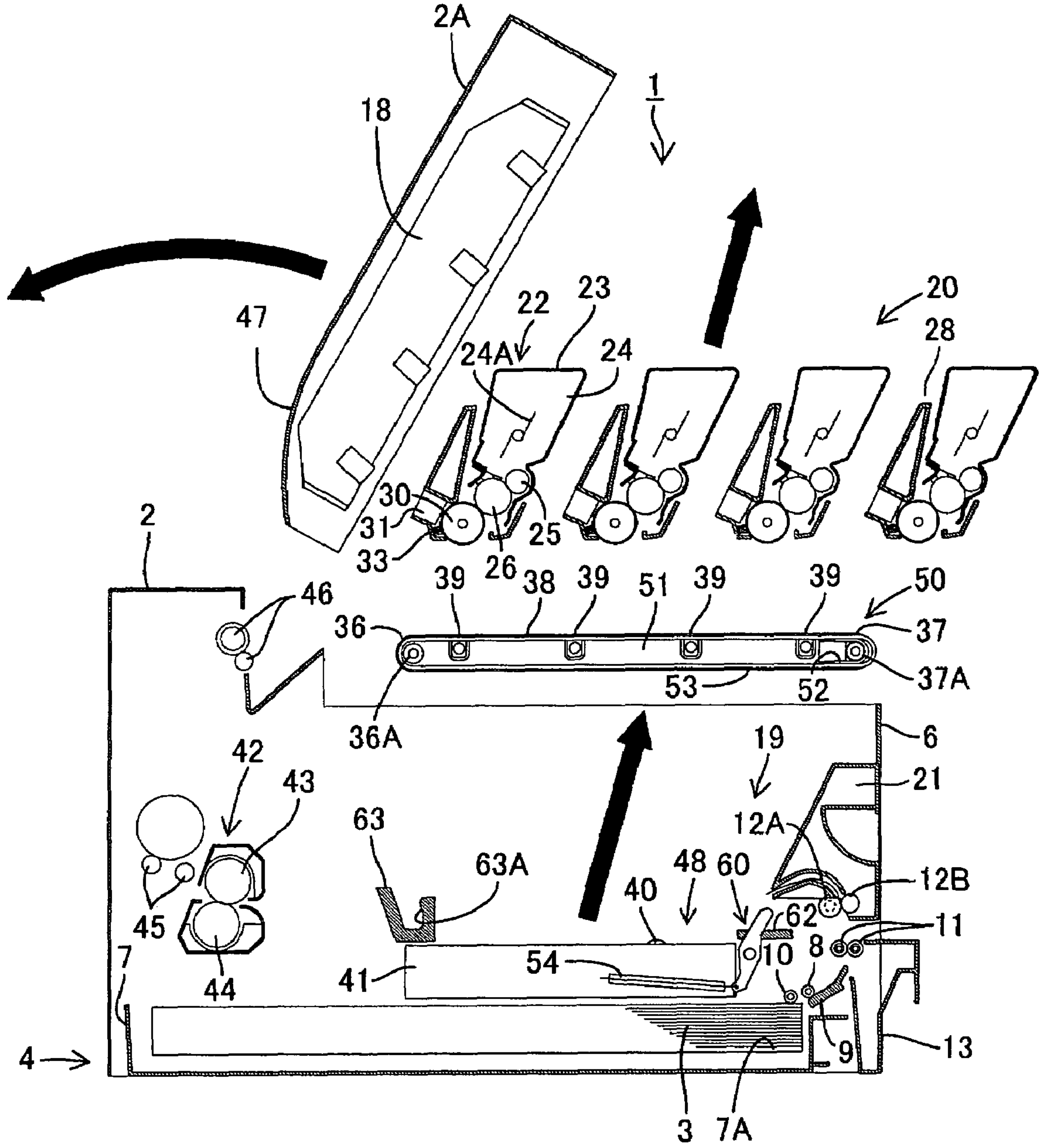
FIG. 2 is a side cross-sectional view of the laser printer of FIG. 1, from which an image forming unit and a belt unit are detached.

FIG. 2 is a side sectional view showing the state where the image forming unit 20 and the belt unit 50 are detached from the laser printer 1.

As shown in FIG. 2, the upper face of the main casing 2, which also serves as the paper discharge tray 47, forms an upper cover 2A which can be opened/closed using the rear end as a center. By opening the upper cover 2A, the image-forming unit 20 and the belt unit 50 can be attached to or detached from the main casing 2. The upper cover 2A is shaped like a box, a lower face of which is opened, and stores the scanner part 18 therein.

Figure 3:
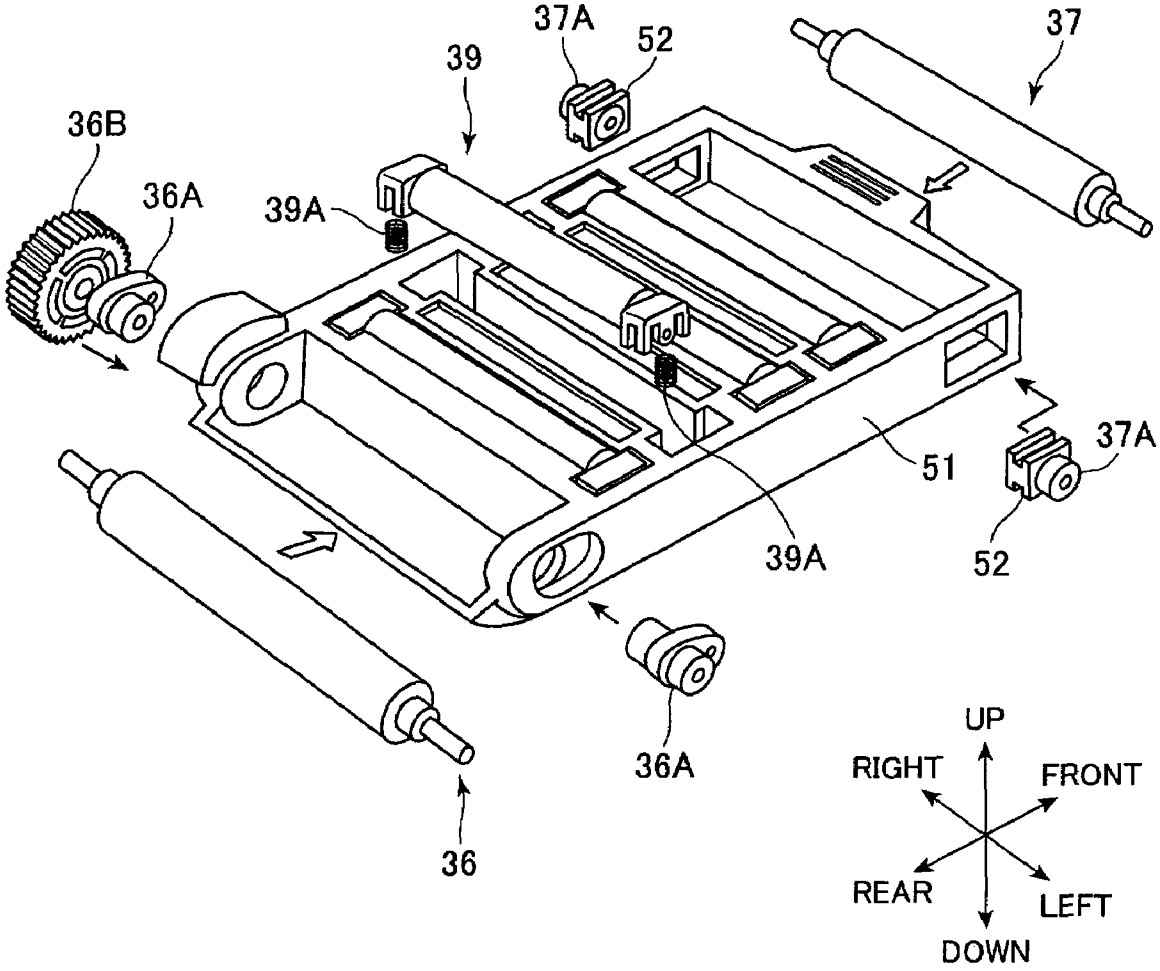
FIG. 3 is an exploded view of a belt unit employed in the laser printer of FIG. 1.

As shown in FIG. 3, the belt supporting roller (drive roller) 36 is rotatably supported at the rear end of the frame 51 via a pair of bearings 36A. The pair of bearings 36A rotatably support a pair of opposite ends of a roller shaft of the belt supporting roller 36 that protrude from the frame 51 outwardly. A gear 36B is mounted on the right-side end of the roller shaft of the belt supporting roller 36. The belt supporting roller (follow roller) 37 is rotatably supported at the front end of the frame 51 via a pair of bearings 37A. The pair of bearings 37A rotatably support a pair of opposite ends of a roller shaft of the belt supporting roller 37 that protrude from the frame 51 outwardly. The pair of bearings 37A are axially supported by a pair of sliding bearing members 52, which are provided at the front end of the frame 51 so as to be slidable in the front-to-rear direction. Thus, the front belt supporting roller 37 can move in the front-to-rear direction relative to the rear belt supporting roller 36 in the front-to-rear direction.

The four transfer rollers 39 are rotatably supported on a pair of opposing side walls of the frame 51 via a pair of springs 39A so as to be aligned at the regular intervals in the front-to-rear direction. Although not shown in the drawing, the backup roller 53 (FIG. 1 and FIG. 2) is rotatably supported on the frame 51.

Figure 4:
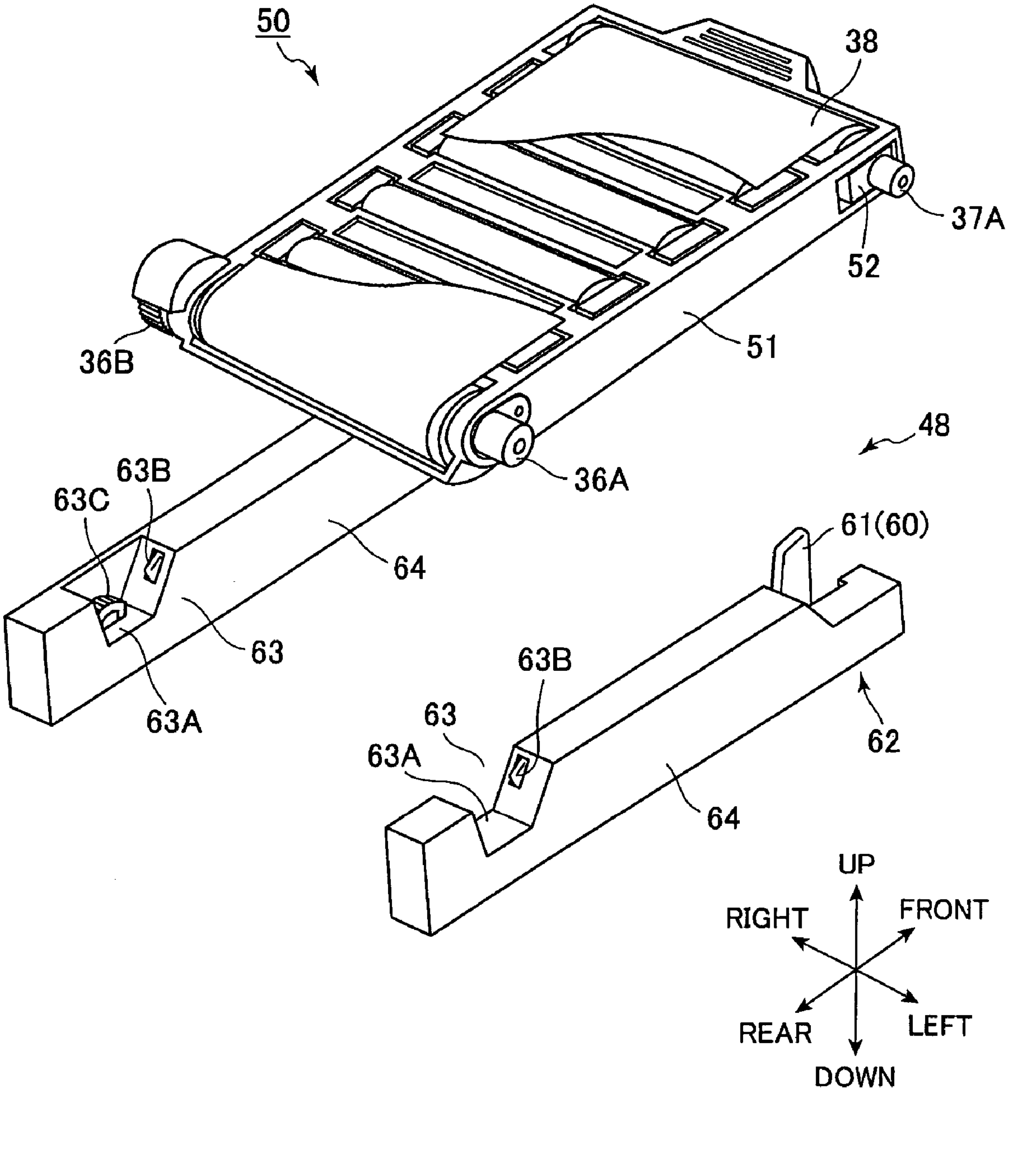
FIG. 4 illustrates the belt unit and support walls in a belt unit storing part of a main casing of the laser printer, onto which the belt unit is detachably mounted.

As shown in FIG. 4, the endless transfer belt 38 is looped around the pair of belt supporting rollers 36, 37 so that the transfer rollers 39 are located between the top and bottom faces of the endless transfer belt 38.

The main casing 2 has a pair of support walls 64 in the belt unit storing part 48. Each support wall 64 is provided with a follow-roller-side positioning portion 62 and a drive-roller-side positioning portion 63 for positioning the belt unit 50. Only the follow-roller-side positioning portion 62 and the drive-roller-side positioning portion 63A of the support walls 64 are indicated in FIG. 1 and FIG. 2. A guide groove 63A is formed on each support wall 64 at its drive-roller-side positioning portion 63. A pawl 63B is provided in the guide groove 63A on each support wall 64. The pawl 63B can protrude into and retract from the guide groove 63A. A gear 63C partially protrudes upwardly from below the bottom of the guide groove 63A on the right-side support wall 64. The gear 63C is connected to a driving motor (not shown) provided in the main casing 2.

Figure 5:
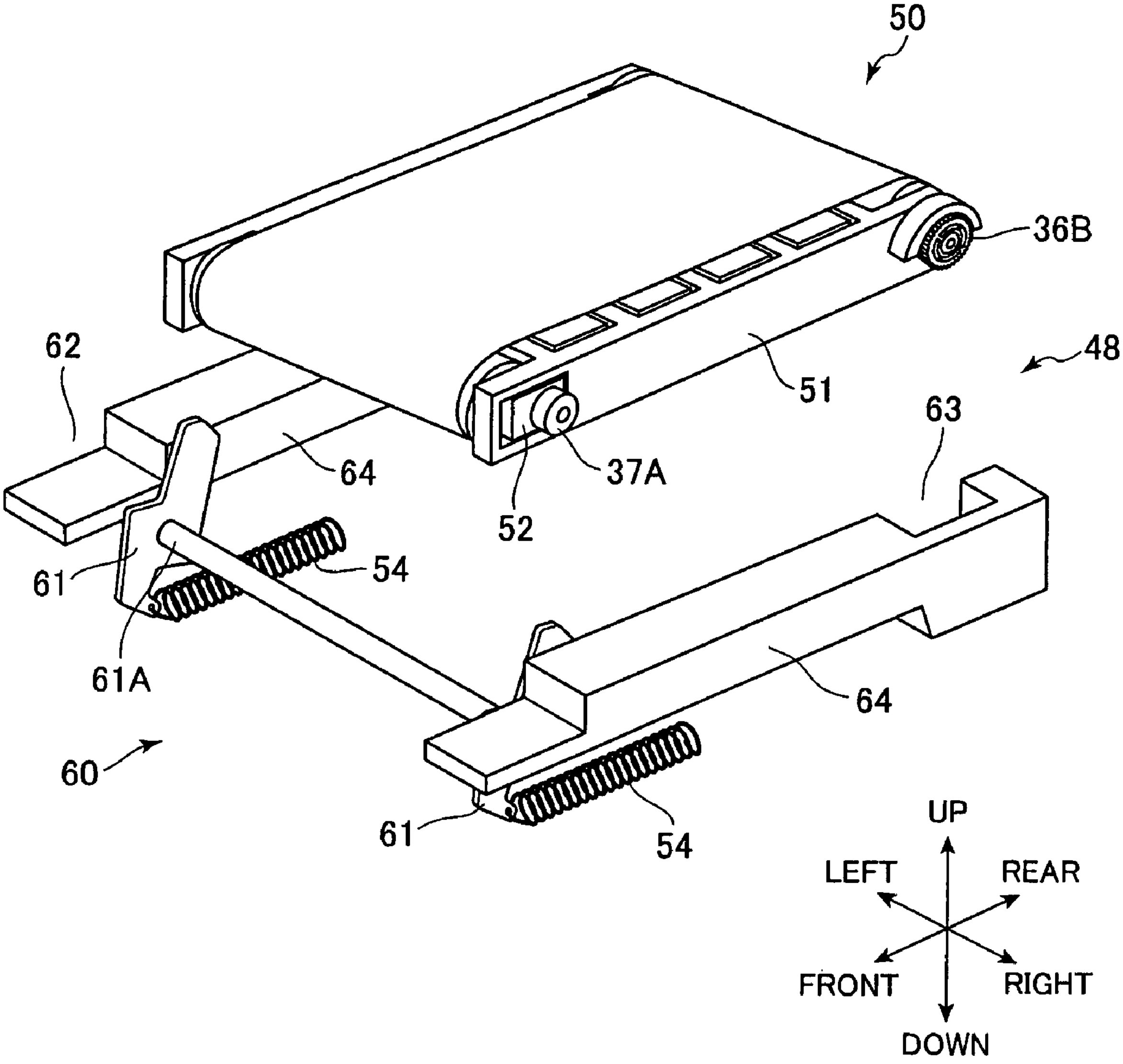
FIG. 5 illustrates a tension-applying mechanism provided in belt unit storing part of the main casing of the laser printer.

As shown in FIG. 5, a tension-applying mechanism 60 is provided in the belt unit storing part 48 of the main casing 2. The tension-applying mechanism 60 has a pair of levers 61, the centers of which are rotatably supported by a rotational shaft 61A that is fixedly secured to the main casing 2 and that extends in the left-to-right direction. The tension-applying mechanism 60 further has a pair of coil springs 54 for urging the pair of levers 61, respectively. As shown in FIG. 1, a rear end of each coil spring 54 is fixed to the main casing 2, while a front end (free end) of each coil spring 54 is connected to a lower end of the corresponding lever 61. An upper end of each lever 61 can swing according to the elastic force of the coil spring 54. As shown in FIG. 5, the pair of levers 61 and the pair of coil springs 54 are arranged in the main casing 2 on the inner sides of the pair of support walls 64, respectively. That is, the left-side set of lever 61 and coil spring 54 is located on the right side of the left-side support wall 64, and the right-side set of lever 61 and coil spring 54 is located on the left side of the right-side support wall 64.

Figure 6:
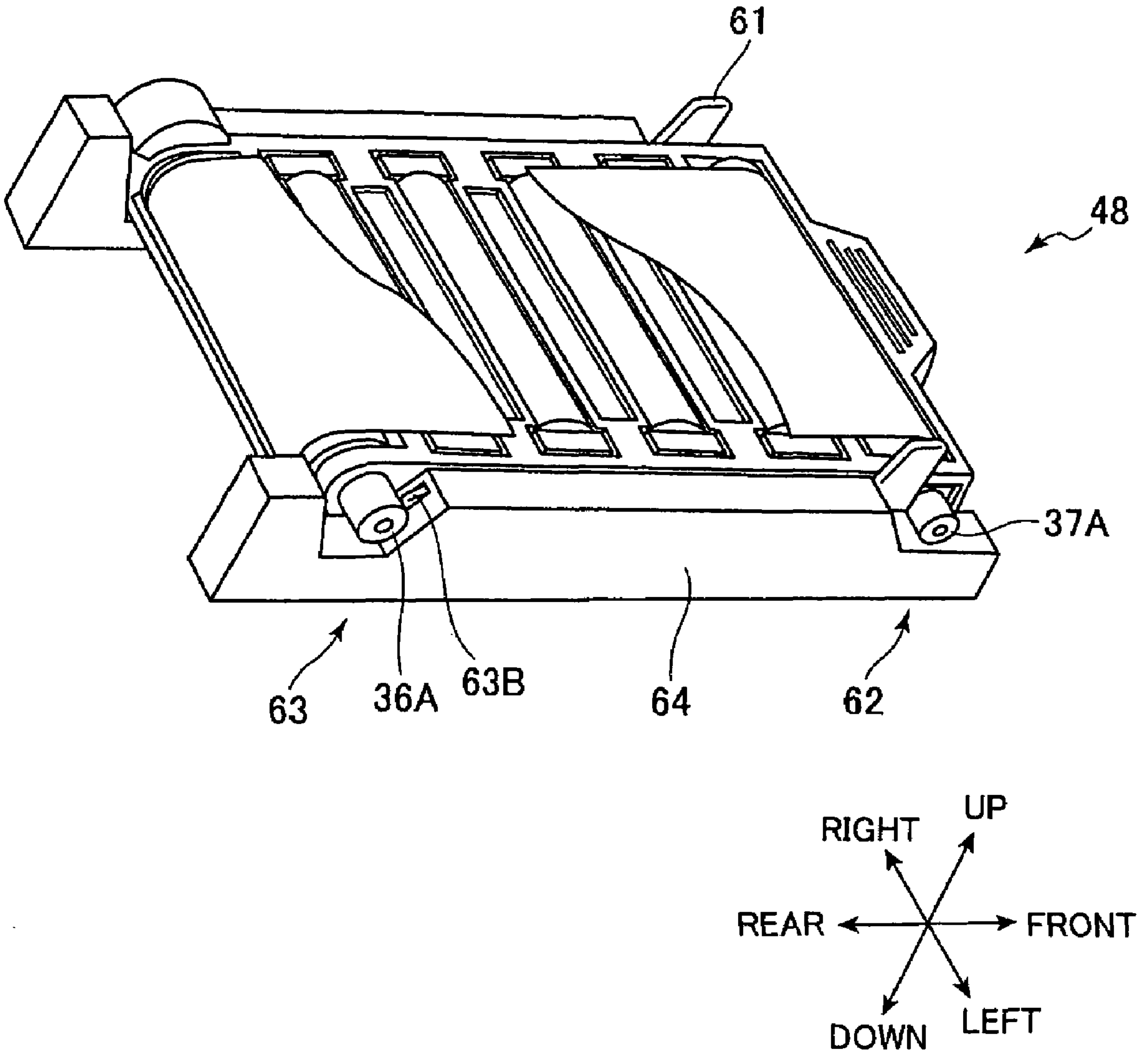
FIG. 6 illustrates how the belt unit is mounted on the support walls in the main casing.

With this configuration, the belt unit 50 is mounted on the support walls 64 in the main casing 2 as shown in FIG. 6 by guiding the pair of bearings 36A downwardly toward the bottom of the guide grooves 63A and by locating the pair of bearings 37A on the follow-roller-side positioning portions 62 of the pair of support walls 64. In this state, the bearings 36A are pressed downwardly by the pawls 63B in the guide grooves 63A so that the belt unit 50 is properly positioned and fixed with respect to the pair of support walls 64 in the main casing 2. In this state, the gear 36B (FIG. 3) is engaged with the gear 63C (FIG. 4) on the main casing 2, and the belt supporting roller 36 is properly connected to the driving motor (not shown) via the engaged gears 36B and 63C. During the image forming process, the belt supporting roller 36 is rotationally driven by receiving a driving force from the driving motor.

Figure 7:
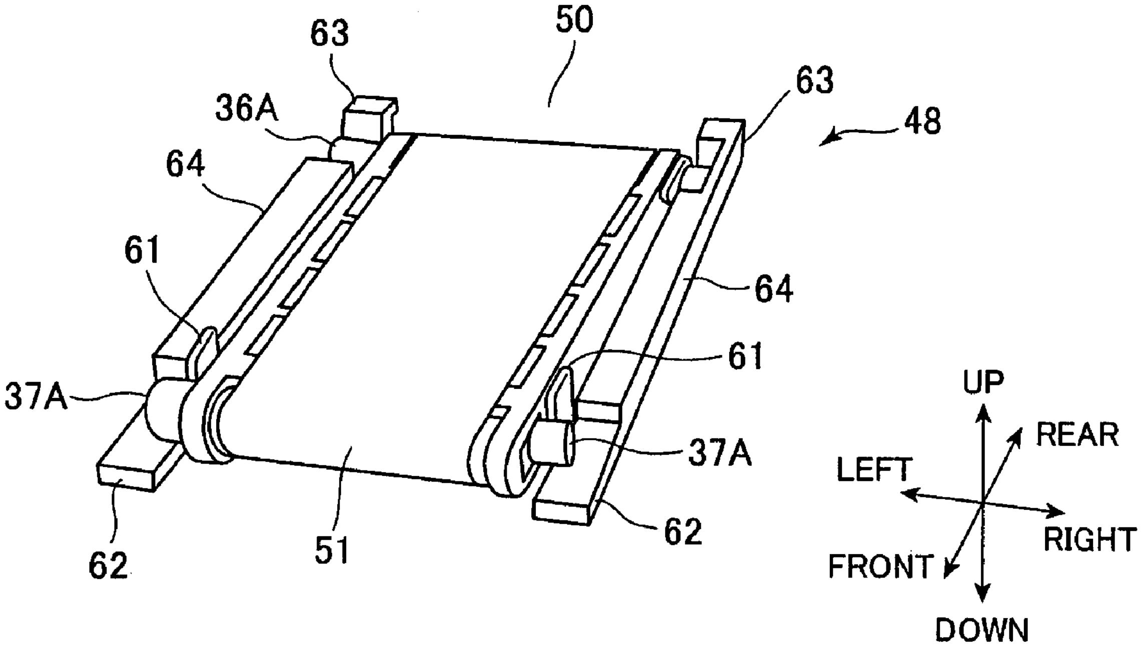
FIG. 7 illustrates the belt unit mounted on the support walls in the main casing viewed from its upper-front side.

When the belt unit 50 is thus mounted in the belt unit storing part 48, as shown in FIG. 7, the front end of the belt unit 50 is located sandwiched between the pair of levers 61 in the right-to-left direction. The rear side surfaces of the pair of bearings 37A are brought into abutment contact with the front surfaces of the upper ends of the pair of levers 61, respectively, thereby resiliently deforming the coil springs 54 into their extended states (FIG. 1). Due to a restoring force of the thus extended coil springs 54, the levers 61 urge the belt supporting roller 37 in the forward direction, that is, in a direction to separate the belt supporting roller 37 away from the belt supporting roller 36, thereby applying tension or tensile force to the transfer belt 38.

Figure 8:
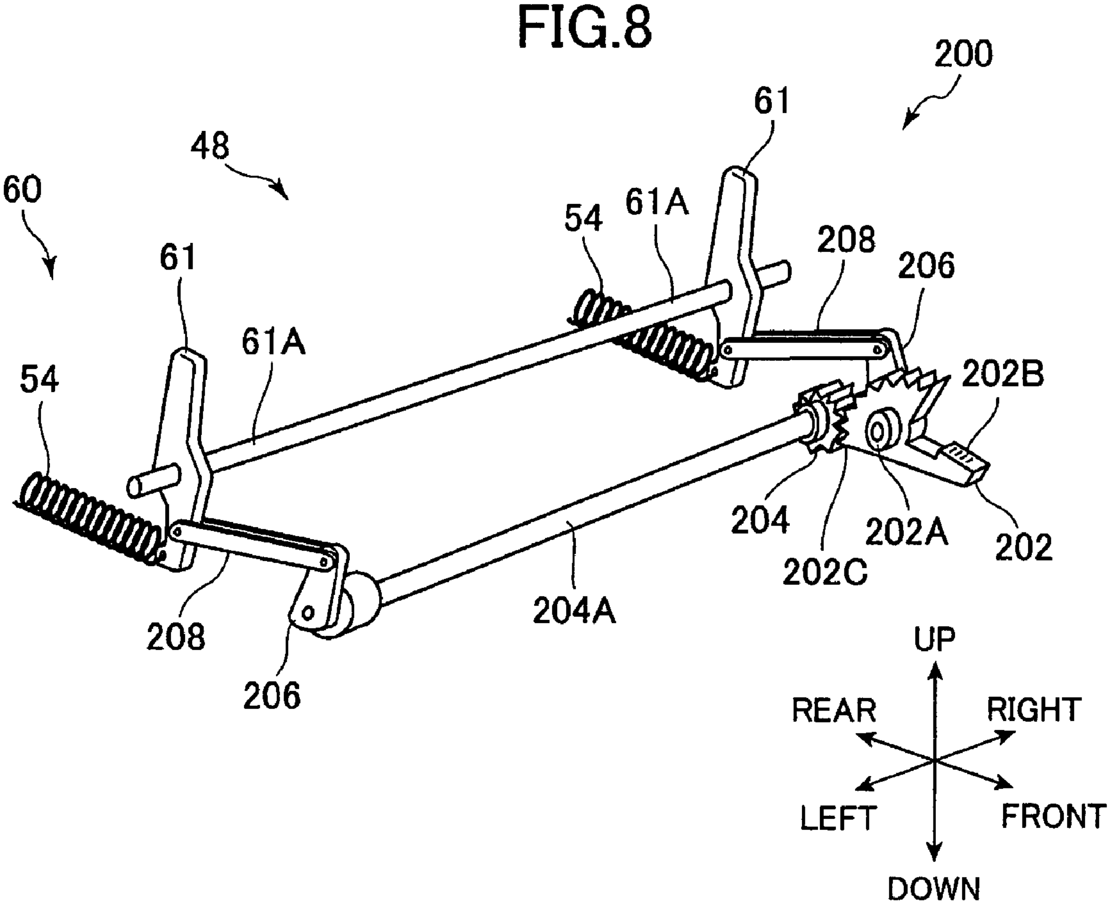
FIG. 8 illustrates a belt tension releasing mechanism provided in the main casing.

As shown in FIG. 8, a belt tension releasing mechanism 200 is provided in the belt unit storing part 48 of the main casing 2. It is noted that though FIG. 8 shows the state of the belt tension releasing mechanism 200 when the belt unit 50 is completely mounted in the belt unit storing part 48, the belt unit 50 is not shown in FIG. 8 for the clarity purposes. The belt tension releasing mechanism 200 includes: a gear lever 202; a gear 204; a pair of first links 206; and a pair of second links 208. The gear lever 202 is rotatably supported by a rotational shaft 202A that is fixedly secured to the main casing 2 and that extends in the left-to-right direction. The gear lever 202 has a lever section 202B and a gear section 202C. A user can access the gear lever 202 when the user opens the upper cover 2A to attach or detach the belt unit 50 in or from the main casing 2. The gear 204 is fixed to a rotational shaft 204A, which is rotatably supported in the main casing 2 at a fixed position and that extends in the left-to-right direction. The gear 204 is in engagement with the gear section 202C. When the gear lever 202 rotates about the rotational shaft 202A, the gear 204 rotates, whereupon the rotational shaft 204A rotates together with the gear 204 around its central axis, The pair of first links 206 are provided on a pair of longitudinal ends (right- and left-side ends) of the rotational shaft 204A. A base end of each first link 206 is fixedly attached on the corresponding end of the rotational shaft 204A. Accordingly, a tip end of each first link 206 pivots around the central axis of the rotational shaft 204A when the rotational shaft 204A rotates about its central axis. A front end of each of the pair of second links 208 is rotatably connected to the tip end of the corresponding first link 206. A rear end of each second link 208 is rotatably connected to the corresponding one of the pair of levers 61. The rear end of the second link 208 is connected to a portion of the corresponding lever 61 that is located between the center part of the lever 61, at which the lever 61 is supported on the rotational shaft 61A, and the lower end of the lever 61, at which the coil spring 54 is connected.

Figure 9A:
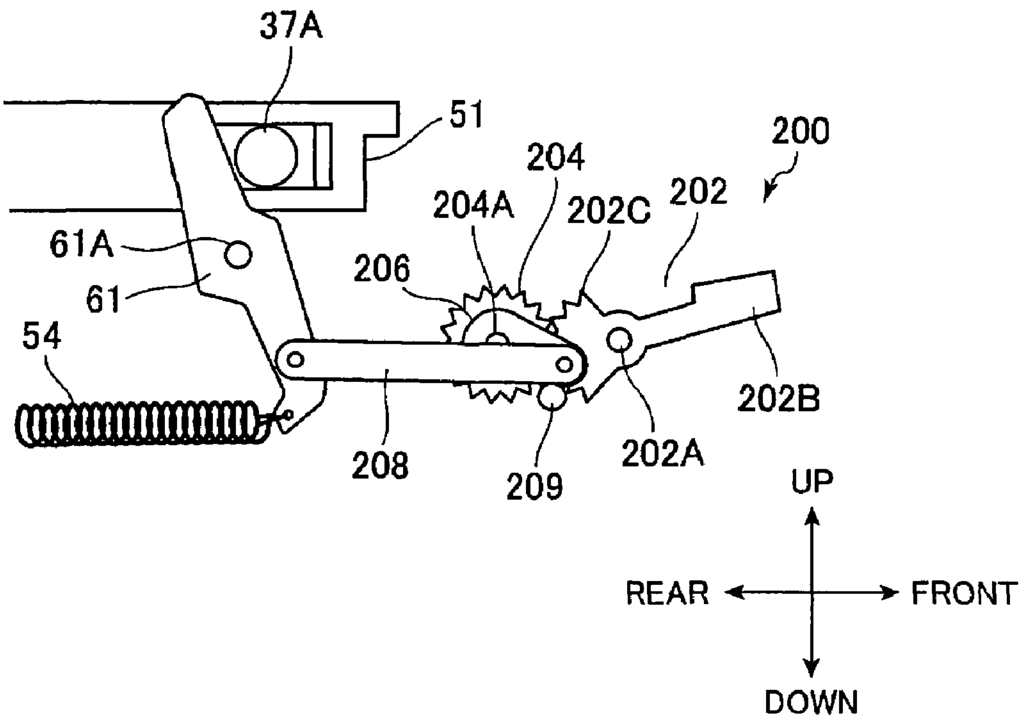
FIG. 9A illustrates how to operate the belt tension releasing mechanism in order to mount the belt unit in the main casing.

With this configuration, when the user desires to mount the belt unit 50 in the main casing 2, as shown in FIG. 9A, the user pulls the lever section 202B of the gear lever 202 upwardly against the resilient force of the coil springs 54. The gear lever 202 rotates about the rotational shaft 202A counterclockwise, and the first links 206 pivot about the rotational axis of the rotational shaft 204A clockwise, thereby causing the levers 61 to rotate about the rotational shaft 61A counterclockwise and the coil springs 54 to be resiliently extended forwardly. It is noted that the first links 206 and the levers 61 stop rotating when the second links 208 are brought into abutment contact with a stopper 209 that is fixedly mounted in the main casing 2. In this state, the user mounts the belt unit 50 in the belt unit supporting part 48 of the main casing 2. The upper portions of the levers 61 are at the locations receding from the path, along which the bearings 37A move downwardly. So, the belt unit 50 can be easily mounted in the belt unit supporting part 48, without being urged by the levers 61.

Figure 9B:
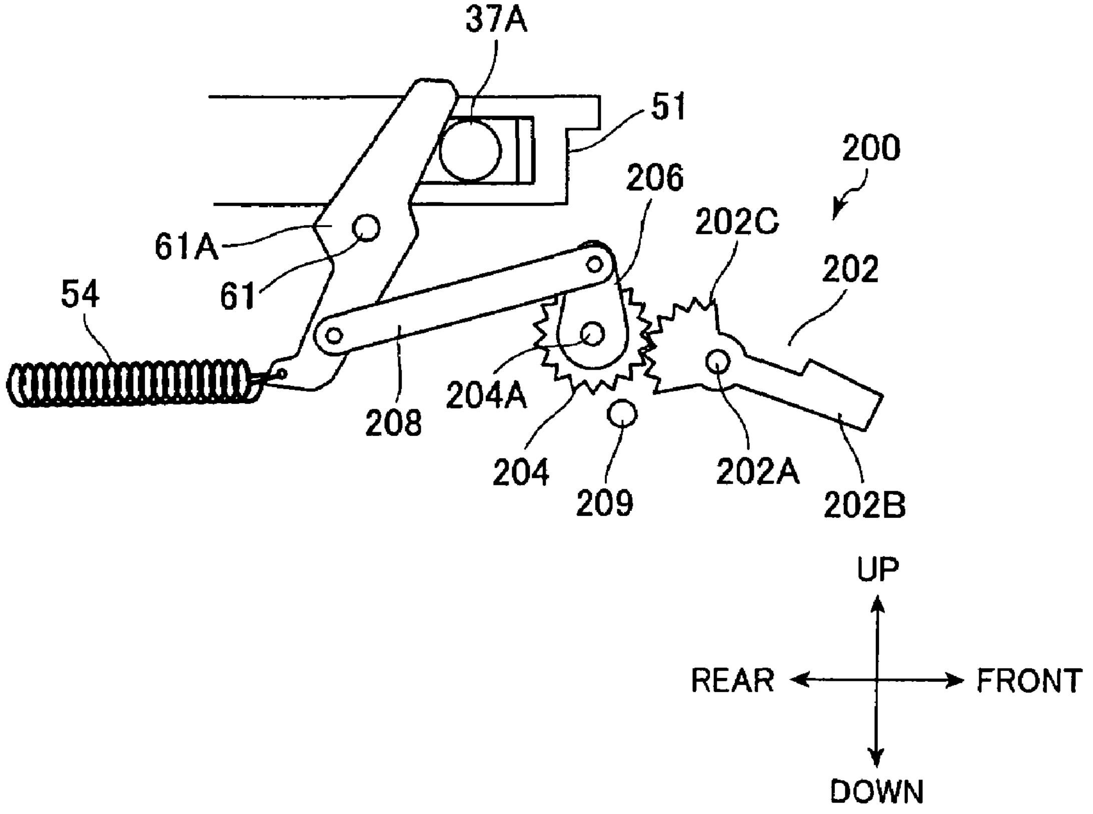
FIG. 9B illustrates the state of the belt tension releasing mechanism when the belt unit is completely mounted in the main casing.

When the belt unit 50 is completely mounted in the belt unit supporting part 48 of the main casing 2 as shown in FIG. 6, the user pushes down the lever section 202B of the gear lever 202. As a result, as shown in FIG. 9B, according to the resilient force of the coil springs 54, the levers 61 rotate about the rotational shaft 61A clockwise in the drawing. The first links 206 pivot about the rotational axis of the rotational shaft 204A counterclockwise, and the gear lever 202 rotates about the rotational shaft 202A clockwise. The levers 61 stop rotating when the levers 61 are brought into abutment contact with the bearings 37A as shown in FIG. 9B. At this time, the coil springs 54 are still in their extended states, even though the extended length of the coil springs 54 in the state of FIG. 9B is shorter than the extended length of the coil springs 54 in the state of FIG. 9A. So, in the state of FIG. 9B, due to the restoring force of the resiliently-extended coil springs 54, the levers 61 properly urge the belt support roller 37 forwardly, that is, in the direction of separating the belt support roller 37 away from the belt support roller 36. The image forming process is executed while the levers 61 urge the belt support roller 37 in the state of FIG. 9B.

When the user desires to detach the belt unit 50 from the main casing 2, the user again pulls the gear lever 202 upwardly as shown in FIG. 9A to release the levers 61 from the bearings 37A, and lifts up the belt unit 50 out of the belt unit storing part 48 in the main casing 2 as shown in FIG. 2.

It is conceivable to use, as the transfer belt 38, a belt made of polyamide or polycarbonate. The polyamide or polycarbonate belt has a relatively small linear expansion coefficient of about 0.00008 cm/cm/° C. In other words, polyamide or polycarbonate belt in a length of one centimeter increases by about 0.00008 cm for a rise in temperature of 1° C. at constant pressure. However, the polyamide or polycarbonate belt is easy to break due to its hardness, resulting in a short life. According to the present embodiment, therefore, the transfer belt 38 is an elastic belt made of an elastomer which is softer and has a longer life than the polyamide or polycarbonate belt.

It is noted that the elastomer transfer belt 38 has a relatively small Young's modulus. Additionally, the elastomer transfer belt 38 has a relatively large linear expansion coefficient of about 0.00015 cm/cm/° C. The transfer belt 38 moves in the vicinity of the fixing unit 42. Accordingly, the transfer belt 38 greatly expands and contracts due to changes in the temperature of the fixing unit 42. Thus, the transfer belt 38 has a relatively small Young's modulus and a relatively large linear expansion coefficient, and greatly extends and contracts due to changes in the temperature. So, the compression springs 54 have to have a relatively small spring modulus in order to apply a stable amount of tension to the transfer belt 38. By setting the spring modulus to a relatively small value, a change in the spring force due to the extension and contraction of the compression springs 54 will become small, and therefore the compression springs 54 can apply a stable tension to the transfer belt 38.

It is noted, however, that as the spring modulus of the compression springs 54 decreases, the length by which the compression springs 54 extend or contract according to the unit load increases. So, if the coil springs 54 with the relatively small spring modulus were provided at the belt unit 50, the overall size of the belt unit 50 will increase. So, according to the present embodiment, the coil springs 54 are provided at the main casing 2 side.

Now assume that the length of the transfer belt 38 is 650 mm at 25° C. When the temperature within the main casing 2 rises from 25° C. to 50° C., the length of the transfer belt 38 increases by 2.44 mm. Accordingly, the distance between the pair of belt supporting rollers 36, 37 increases by 1.22 mm. Considering the situation where the temperature within the main casing 2 is low in cold districts or during winter, when the temperature within the main casing 2 lowers from 25° C. to 10° C., the transfer belt 38 is contracted by 1.46 mm. Accordingly, the distance between the pair of belt supporting rollers 36, 37 decreases by 0.73 mm. Thus, the distance between the belt supporting roller 36, 37 can be changed by 1.95 mm in total due to the change in temperature. To limit the change in loads to 10% or less in response to this change in the distance between the belt supporting roller 36, 37, the coil springs 54 have to have a spring modulus of 1.03 N/mm (0.10 kgf/mm) or smaller.

The main casing 2 is provided with the tension-applying mechanism 60 for applying an urging force to the belt supporting roller 37, thereby applying tension to the transfer belt 38. By employing the coil springs 54 having a relatively small spring modulus, the tension-applying mechanism 60 can apply a stable amount of tension to the transfer belt 38 which has a small Young's modulus and a large linear expansion coefficient and greatly extends and contracts due to changes in the temperature. Because a stable amount of urging force can be applied to the opposite ends of the belt supporting roller 37, the transfer belt 38 can be prevented from moving obliquely during the image forming process.

In addition, by providing at the main casing 2 side the coil springs 54 that have a relatively small spring modulus and whose lengths change by a relatively large amount according to the unit load, increase of the size of the belt unit 50 can be avoided.

The coil springs 54 are not held by the belt unit 50. Accordingly, it is unnecessary to enhance the rigidity of the belt unit 50.

When the belt unit 50 is properly mounted in the main casing 2, the coil springs 54 are extended to generate a restoring force and apply the restoring force to the transfer belt 38 as tension. Accordingly, no axial displacement occurs in the coil springs 54 and the coil springs 54 can apply more stable tension onto the transfer belt 38 in comparison with the case where the coil springs 54 were contracted to generate the restoring force to apply the restoring force to the transfer belt 38.

The belt supporting roller 37 is urged in a direction to separate away from the belt supporting roller 36 along the horizontal direction, in which the belt supporting rollers 37 and 37 are arranged. Therefore, even when the length of the transfer belt 38 changes due to the change in temperature, the pair of belt supporting rollers 36, 37 are not vertically displaced. That is, the transfer belt 38 is not shifted toward or away from the image-forming unit 20 that is located opposing the upper face (upper outer circumference side) of the transfer belt 38 and toward or away from the belt-cleaning unit 41 that is located opposing the lower face (lower outer circumference side) of the transfer belt 38. Accordingly, the transfer belt 38 can properly cooperate with the image-forming unit 20 and the belt-cleaning unit 41 to attain accurate image forming and cleaning operations.

Figure 10A:
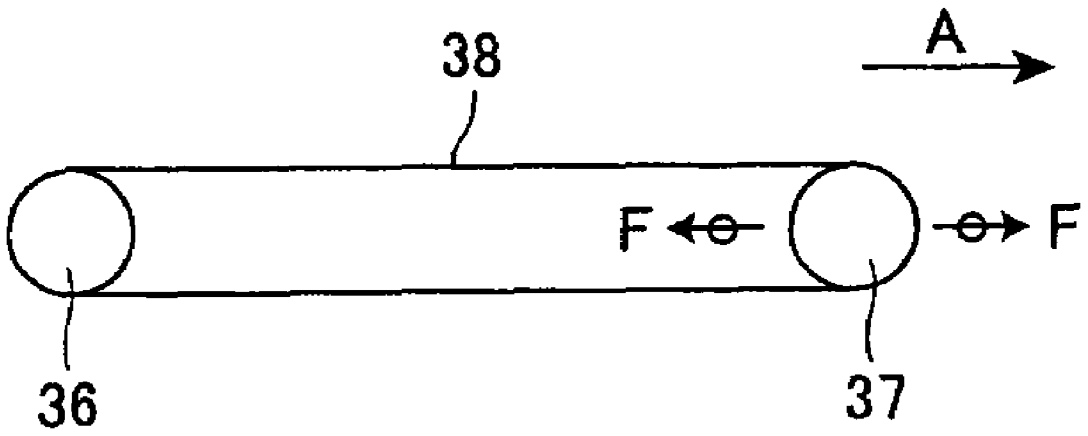
FIG. 10A illustrates how tension is applied according to the first embodiment.

As shown in FIG. 10A, according to the first embodiment, the follow roller 37 is pulled away from the driving roller 36 by a proper amount of distance in a direction A, in which the follow roller 37 and the driving roller 36 are arranged. As a result, the transfer belt 38 is applied with the tension F, whose amount is sufficiently large that can prevent the transfer belt 38 from slipping over the driving roller 36.

Figure 10B:
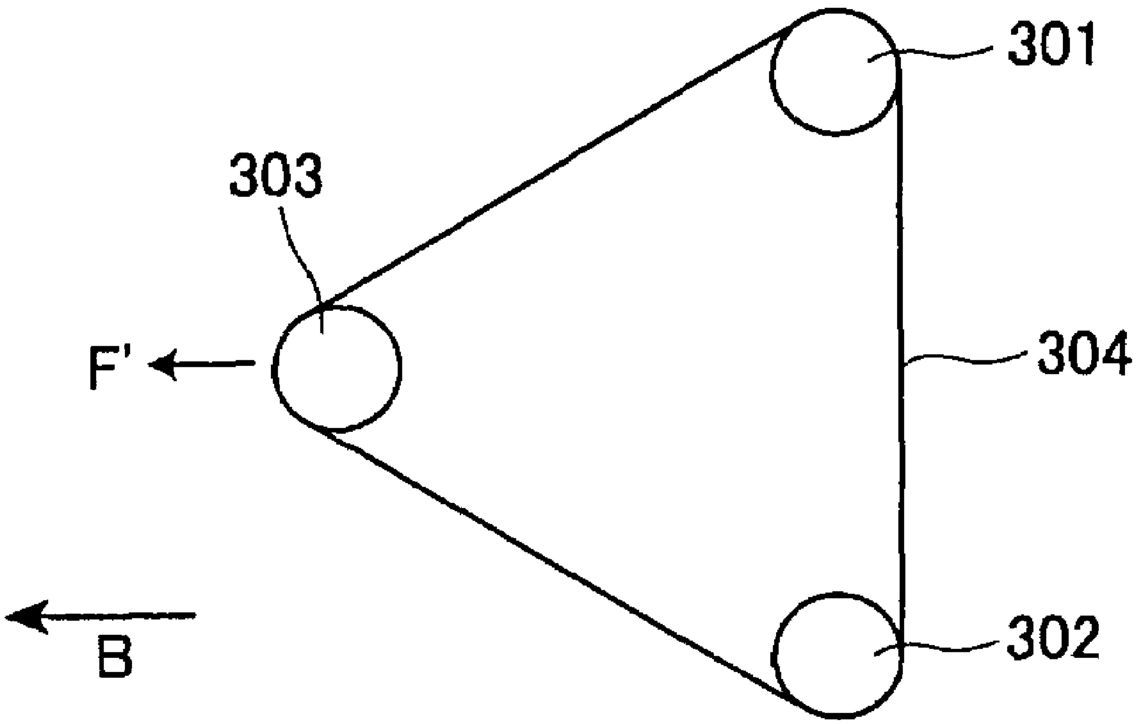
FIG. 10B illustrates how tension is applied according to a comparative example.

It is now assumed that in a comparative example, a driving roller 301, a follow roller 302, and a tension roller 303 are arranged as shown in FIG. 10B. A belt 304 is looped on the driving roller 301, follow roller 302, and tension roller 303. The tension roller 303 is pulled in a direction B, along which the driving roller 301 and the tension roller 303 are not arranged. In order to apply the belt 304 with the tension force F, whose amount is sufficiently large that can prevent the belt 304 from slipping over the driving roller 301, it is necessary to pull the tension roller 303 with a force F' that is greater than the force F. This is because the force applied to the tension roller 303 is not applied to the belt 304 directly, but only a part of the force applied to the tension roller 303 is applied to the belt 304. Accordingly, the tension roller 303 has to be pulled in the direction B by a distance that is greater than the distance by which the follow roller 36 is pulled in the present embodiment. Thus, according to the present embodiment, the follow roller 37 can be pulled with a smaller amount of force by a shorter distance than the tension roller 303 in the comparative configuration.

It is noted that not only paper recording medium, but also other kinds of recording media, such as plastic recording medium (OHP sheets, for example) can be printed by the laser printer 1.

Second Embodiment

A second embodiment will be described with reference to FIG. 11 to FIG. 15.

The direct tandem color laser printer 1 is described in the first embodiment. The direct tandem color laser printer 1 employs the direct transfer method of directly transferring a developer image on the recording medium. The direct tandem color laser printer 1 has the transfer belt 38 for conveying the paper 3 thereon. The transfer belt 38 serves to carry a developer image via a recording medium conveyed thereon. Contrarily, a laser printer 70 of the present embodiment is an intermediate transfer tandem color laser printer 70 that employs an intermediate transfer method of indirectly transferring a developer image via an intermediate transfer belt 71 onto the recording medium. The intermediate transfer belt 71 directly carries thereon a developer image transferred from the photosensitive drum 30, before transferring the developer image onto the recording medium.

Figure 11:
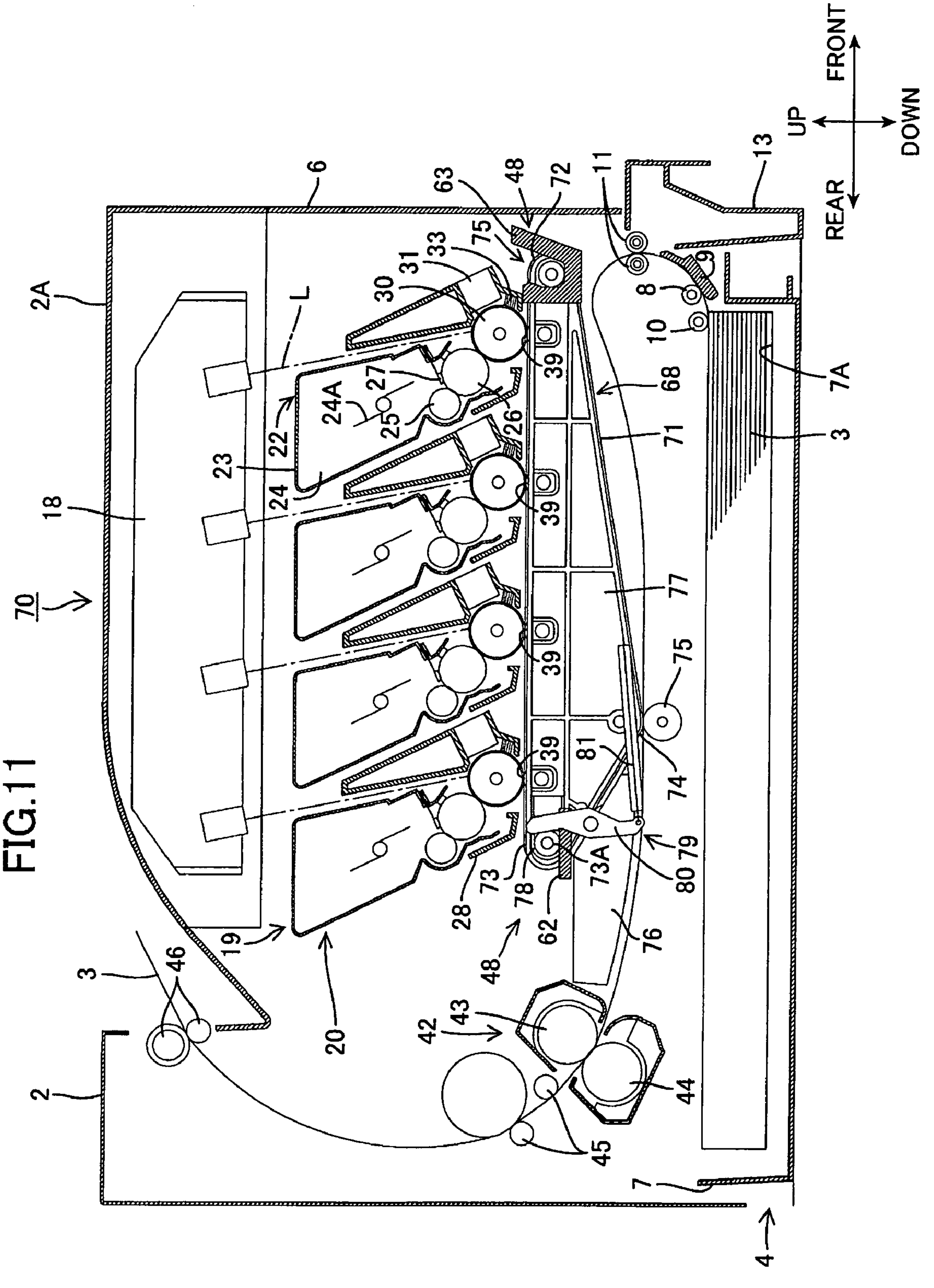
FIG. 11 is a side cross-sectional view of a laser printer according to a second embodiment.

FIG. 11 shows the laser printer 70 of the second embodiment.

The laser printer 70 is the same as the laser printer 1 of the first embodiment except for the points described below.

A belt unit 68 is detachably mounted in the main casing 2 of the laser printer 70 instead of the belt unit 50 of the first embodiment. The belt unit 68 includes a frame 77. Three belt supporting rollers 72, 73, and 74 are rotatably supported on the frame 77. Among the three belt supporting rollers 72, 73, and 74, the belt supporting roller 72 is a driven to be rotated, and the belt supporting rollers 73 and 74 rotate following the rotation of the belt supporting roller 72. The belt supporting rollers 72 and 73 are aligned in the front-to-rear direction. The belt supporting roller 74 is positioned at a location that is below the rollers 72 and 73. In other words, the belt supporting roller 74 is positioned at a location shifted vertically downwardly from an imaginary horizontal plane on which the rollers 72 and 73 are arranged. The belt supporting roller 74 is positioned between the rollers 72 and 73 but is closer to the roller 73 than to the roller 72.

A pair of opposite ends (longitudinal ends) of the belt supporting roller 73 are received in a pair of sliding bearing members 78 (shown in FIG. 13), which are slidably mounted on the frame 71. The pair of sliding bearing members 78 are slidable in the front-to-rear direction.

The intermediate transfer belt 71 is looped around the three belt supporting rollers 72, 73, and 74. The intermediate transfer belt 71 is an elastomer belt, which has a relatively small Young's modulus and a relatively large linear expansion coefficient of about 0.00015 cm/cm/° C. The four transfer rollers 39 rotatably supported on the frame 77 are located inside the loop of the intermediate transfer belt 71. The intermediate transfer belt 71 moves circularly clockwise in FIG. 11 when the belt supporting roller 72 is driven to rotate. As the intermediate transfer belt 71 moves in one rotation, toner of each color is sequentially transferred thereon and superposed on each other, forming a four-color toner image. The four-color toner image is subsequently transferred at once onto the paper 3 at a transfer position defined between the support roller 74 and a transfer roller 75 that is disposed in the main casing 2 below and in opposition to the support roller 74.

The laser printer 70 also includes a belt-cleaning unit 76 in place of the belt-cleaning unit 41 of the first embodiment. The belt-cleaning unit 76 is provided at a position for cleaning the intermediate transfer belt 71 between the belt support rollers 73 and 74 downstream of the transfer position between the support roller 74 and transfer roller 75.

Figure 12:
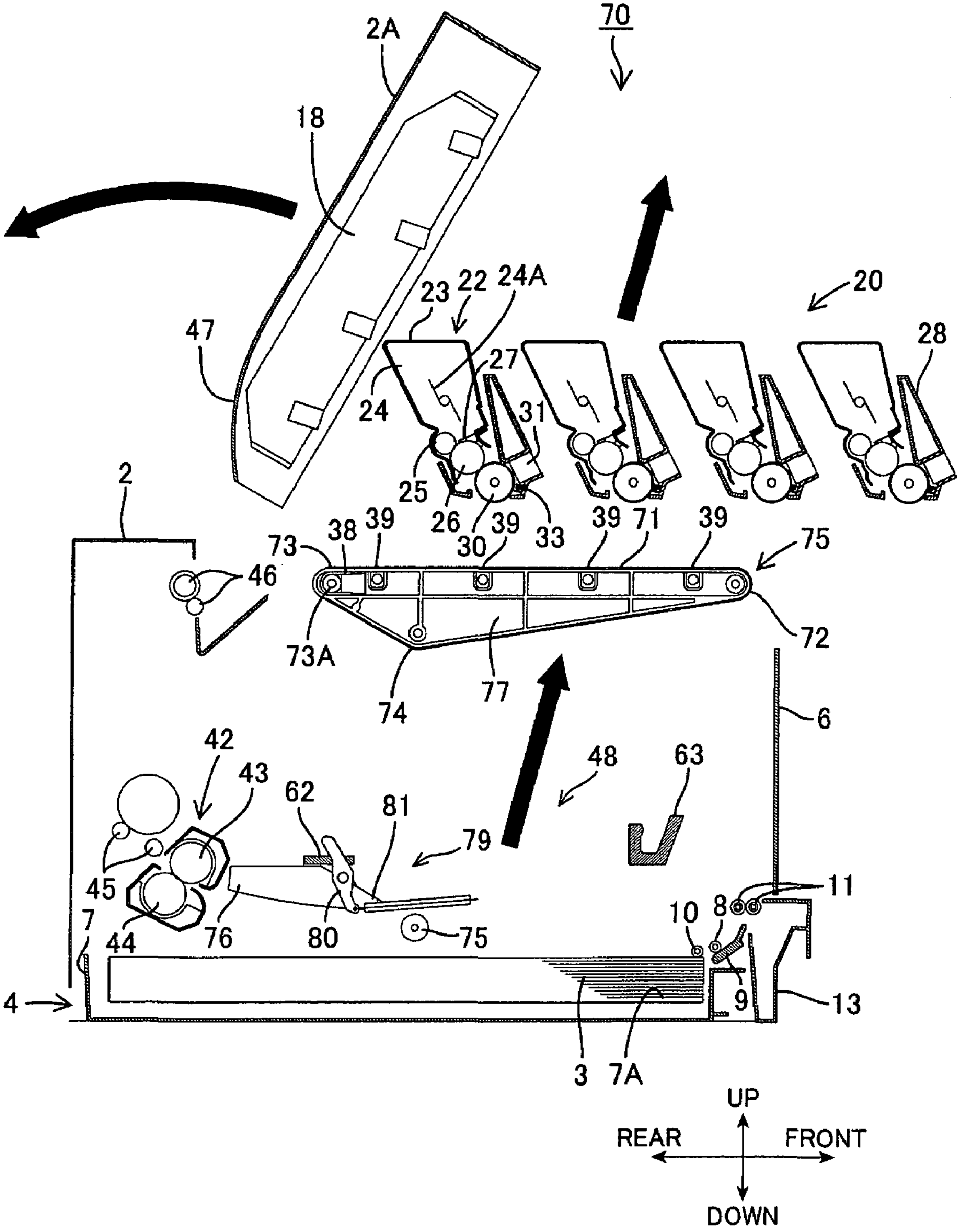
FIG. 12 is a side cross-sectional view of the laser printer of FIG. 11, from which an image forming unit and a belt unit are detached.

The belt unit 68 having the above-described structure and the image-forming unit 20 can be detached from the main casing 2 via the upper cover 2A as shown in FIG. 12.

Figure 13:
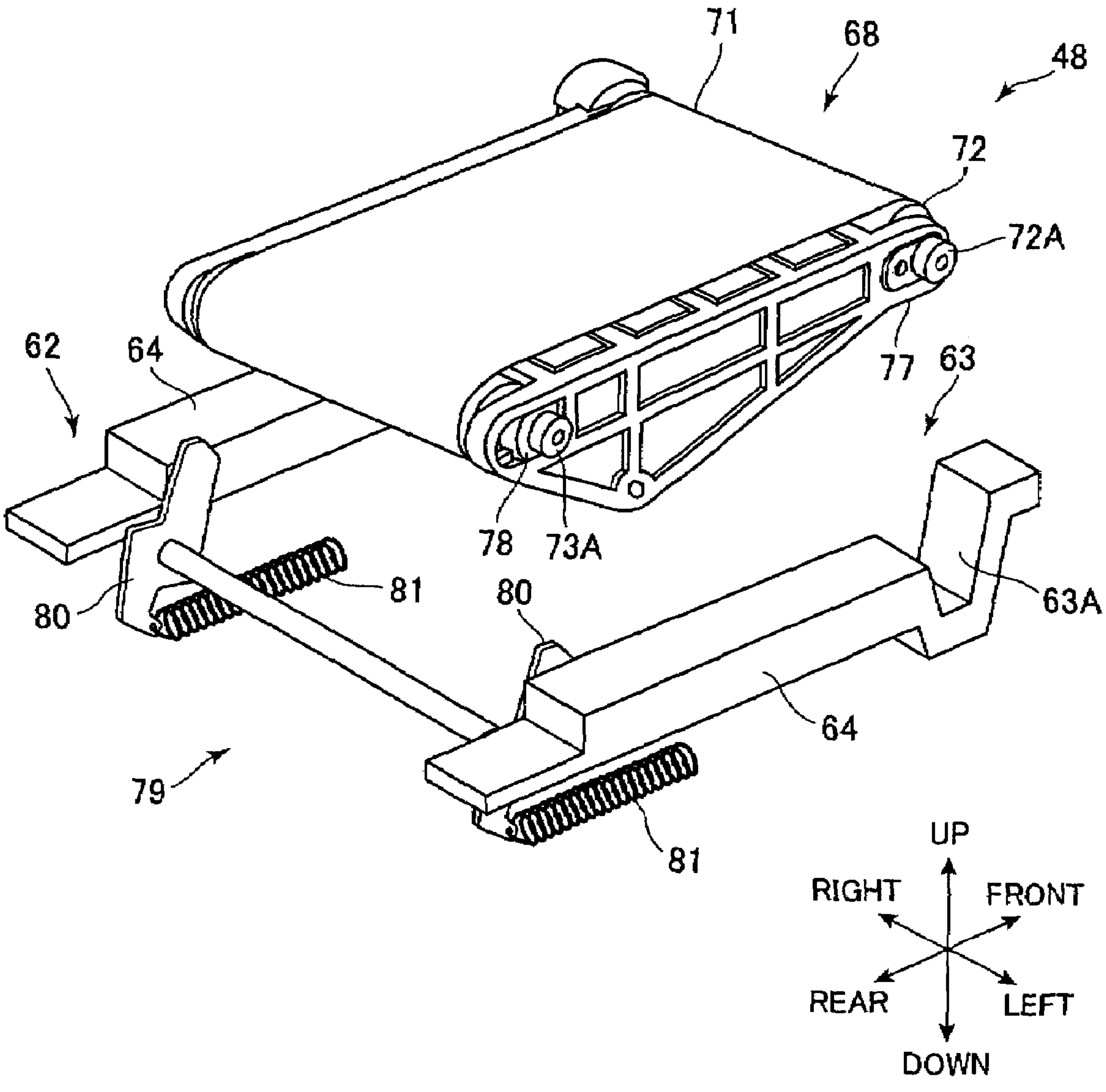
FIG. 13 illustrates a tension-applying mechanism provided in the belt unit storing part of the main casing of the laser printer.
Figure 14:
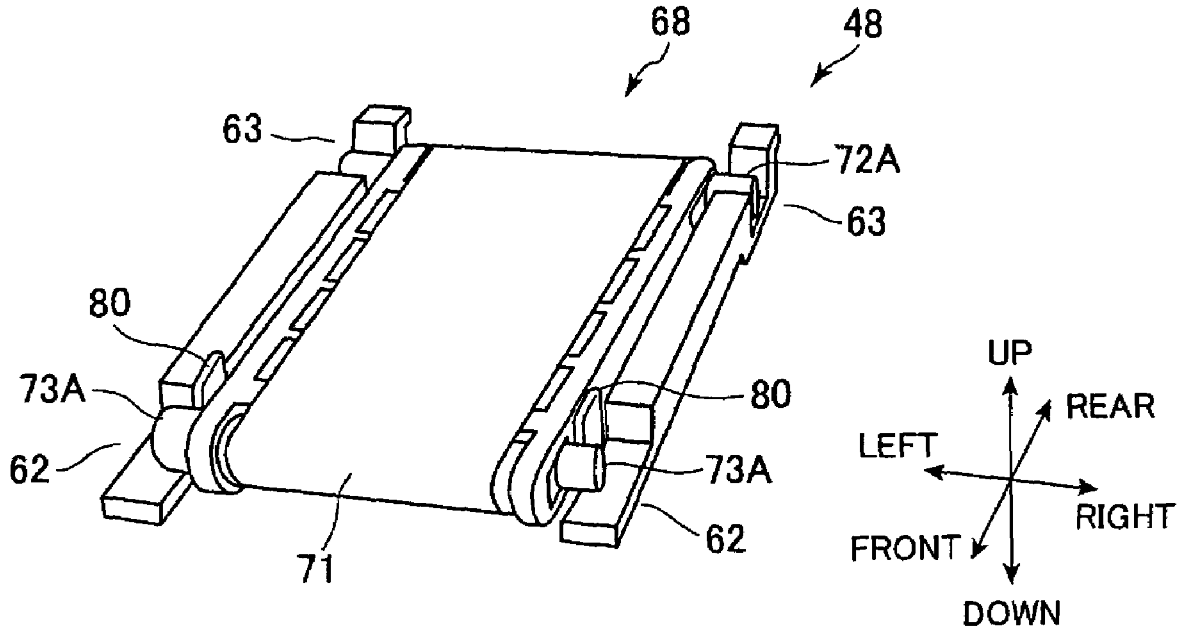
FIG. 14 illustrates the belt unit mounted in the belt unit storing part of the main casing viewed from its upper-rear side.

As shown in FIG. 13, in the main casing 2 of the laser printer 70, the pair of support walls 64 are oriented, with its follow-roller-side positioning portion 62 being located in the rear side of the main casing 2 and the drive-roller-side positioning portion 63 being located in the front side of the main casing 2. When the belt unit 68 is mounted in the main casing 2, the bearings 73A are received in the follow-roller-side positioning portions 62 of the support walls 64 and bearings 72A that rotatably support the pair of opposite ends of the belt supporting roller 72 are received in the drive-roller-side positioning portions 63 of the support walls 64 as shown in FIG. 14.

A tension-applying mechanism 79 is provided in the main casing 2 instead of the tension mechanism 60 of the first embodiment. The tension-applying mechanism 79 has a pair of levers 80 and a pair of coil springs 81 that have the same configurations with the pair of levers 61 and the pair of coil springs 54 in the first embodiment.

The front end of each coil spring 81 is fixed to the main casing 2, and the rear, free end of each coil spring 81 is connected to the lower end of the corresponding lever 80. As shown in FIG. 14, when the belt unit 68 is mounted in the main casing 2, the bearings 73A of the belt supporting roller 73 hit against the upper ends of the levers 80 from behind. At this time, the coil springs 81 are elastically deformed into the extended state (FIG. 11). By the restoring force, the belt supporting roller 73 is urged in the direction to separate away from the belt supporting roller 72 (backward direction), thereby applying tension to the intermediate transfer belt 71 as shown in FIG. 11.

With this configuration, the same advantages as in the first embodiment can be obtained.

Furthermore, even when the intermediate transfer belt 71 extends or contracts and the belt supporting roller 73 is displaced, the part of the intermediate transfer belt 71 defined between the rollers 72 and 73, which is located opposing the photoconductive drums 30, is not vertically displaced and therefore does not move toward or away from the photoconductive drums 30. Accordingly, the intermediate transfer belt 71 can accurately perform the image forming operation.

The part of the intermediate transfer belt 71 defined between the belt supporting rollers 73 and 74 is not displaced in the direction perpendicular to the extending direction of the intermediate transfer belt 71. Accordingly, the belt-cleaning unit 76 can accurately perform the cleaning operation.

The part of the intermediate transfer belt 71 defined between the belt supporting rollers 72 and 74 is not displaced in the direction perpendicular to the extending direction of the intermediate transfer belt 71. Accordingly, other processing units such as the belt-cleaning unit 76 can be provided opposing the part of the intermediate transfer belt 71 between the belt supporting rollers 72 and 74.

Figure 15:
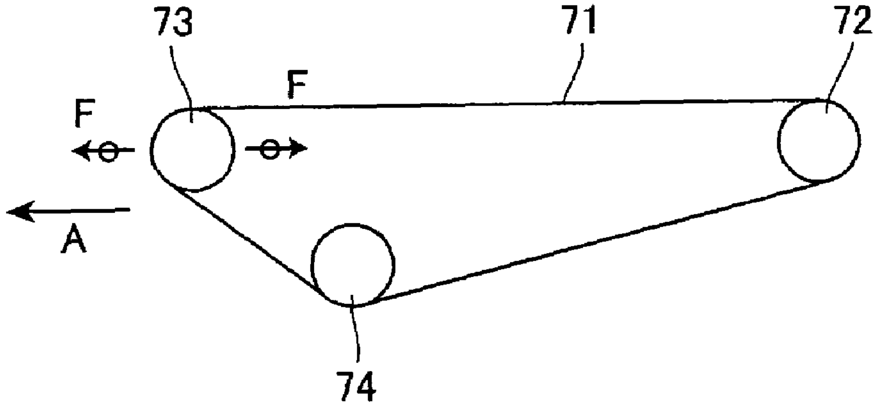
FIG. 15 illustrates how tension is applied according to the second embodiment.

As shown in FIG. 15, according to the present embodiment, the follow roller 73 is pulled away from the driving roller 72 by a proper amount of distance in a direction A, in which the follow roller 73 and the driving roller 72 are arranged. As a result, the intermediate transfer belt 71 is applied with the tension F, whose amount is sufficiently large that can prevent the belt 71 from slipping over the driving roller 72. Contrarily, as described with reference to FIG. 10B, in the comparative example, in order to apply the belt 304 with the tension force F, whose amount is sufficiently large that can prevent the belt 304 from slipping over the driving roller 301, it is necessary to pull the tension roller 303 with a force F' that is greater than the force F. In other words, the tension roller 303 has to be pulled in the direction B by a distance that is greater than the distance by which the follow roller 73 is pulled in the present embodiment. Thus, according to the present embodiment, the follow roller 73 can be pulled with a smaller amount of force by a shorter distance than the tension roller 303 in the comparative configuration.

It is noted that a plurality of belt supporting rollers 74 may be provided in place of the single belt supporting roller 74.

Third Embodiment

A third embodiment will be described with reference to FIG. 16 and FIG. 17.

A laser printer 90 according to this embodiment is the same as the laser printer 1 of the first embodiment except for the points described below.

Figure 16:
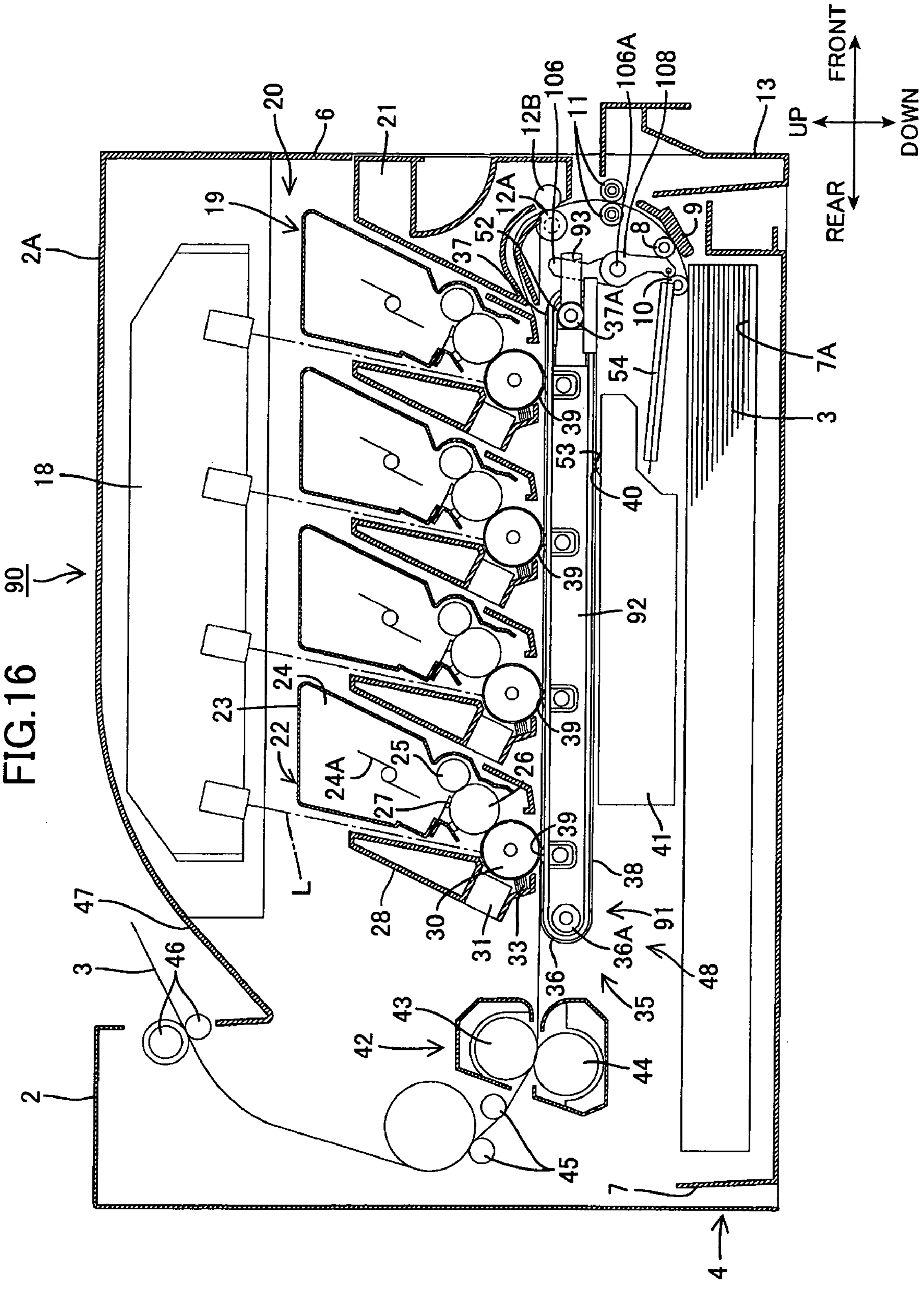
FIG. 16 is a side cross-sectional view of a laser printer according to a third embodiment.
Figure 17:
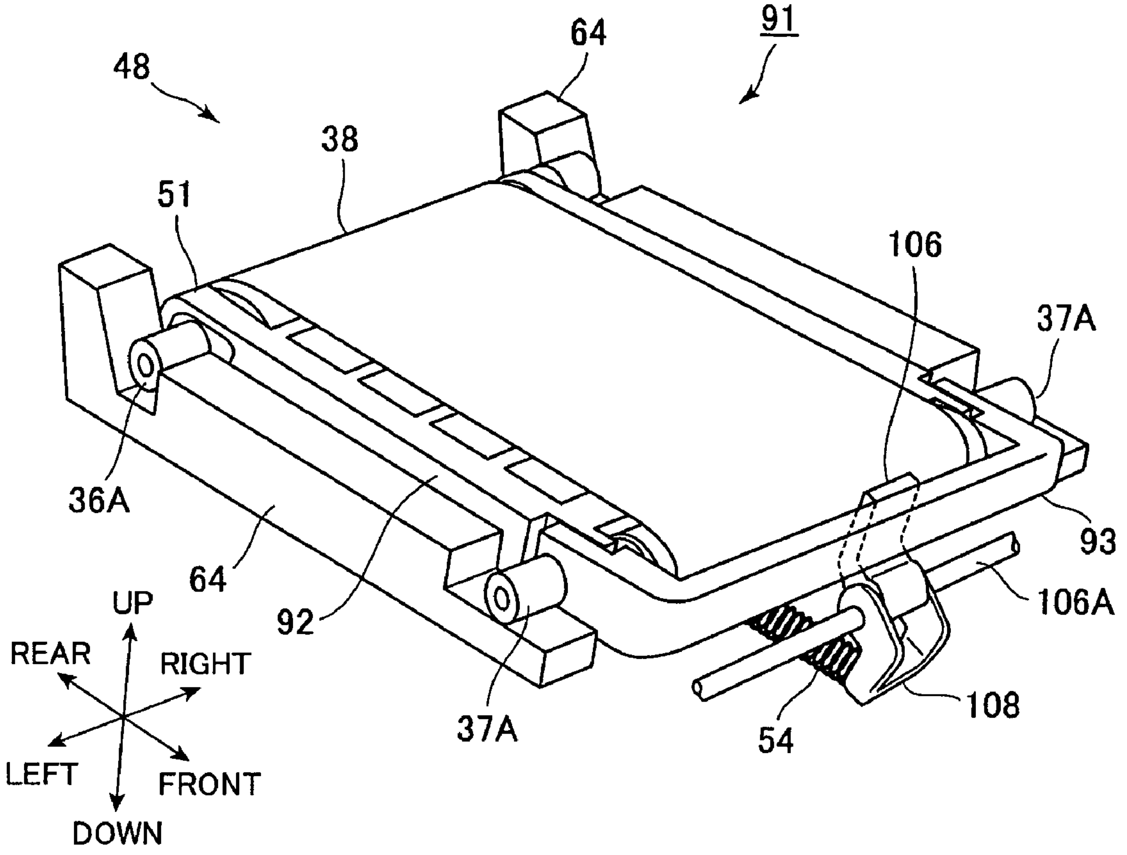
FIG. 17 illustrates how a belt unit is mounted in the belt unit storing part of the main casing according to the third embodiment.

As shown in FIG. 16 and FIG. 17, a belt unit 91 is provided in the laser printer 90 instead of the belt unit 50 in the first embodiment. The belt unit 91 is the same as the belt unit 50 except that the belt unit 91 has a frame 92 and a U-shaped hooking part 93. The frame 92 is the same as the frame 51 in the first embodiment except that the shape of the front part of the frame 92 is changed to receive the U-shaped hooking part 93 thereon. The U-shaped hooking part 93 is slidably mounted on the front part of the frame 92, with its pair of opposite ends being attached to the portions of the pair of bearings 37A that protrude outwardly from the frame 92. The bearings 37A rotatably support the pair of opposite ends of the belt supporting roller 37, and are slidably supported on the frame 92 via the sliding bearing members 52 (FIG. 16) in the same manner as in the first embodiment. Accordingly, the U-shaped hooking part 93 and the belt supporting roller 37 can move together in the front-to-rear direction relative to the frame 92.

While the pair of coil springs 54 and the pair of levers 61 are provided in the main casing 2 of the first embodiment, a single coil spring 54 and a single engaging lever 106 are provided in the main casing 2 of this embodiment. The coil spring 54 and the engaging lever 106 are provided at the left-to-right center portion between the pair of support walls 64. As shown in FIG. 16, the belt-cleaning unit 41 has a recess at its front bottom to receive therein the coil spring 54 and the engaging lever 106.

A rotational shaft 106A is rotatably supported in the main casing 2 and extends in the left-to-right direction. The rotational shaft 106A is rotatable about its central axis. The engaging lever 106 is mounted on the rotational shaft 106A so that the engaging lever 106 confronts the left-to-right center of the U-shaped hooking part 93 when the belt unit 91 is mounted in the main casing 2. A base end of the engaging lever 106 is fixedly secured to the rotational shaft 106A. A connection member 108 is also mounted on the rotational shaft 106A. A base end of the connection member 108 is fixedly secured to the rotational shaft 106A, and a tip end of the connection member 108 is connected to the front end of the coil spring 54. The tip ends of the engaging lever 106 and of the connection member 108 pivot around the rotational axis of the rotational shaft 106A when the rotational shaft 106A rotates around its rotational axis. Accordingly, the coil spring 54 is resiliently extended in accordance with the rotation of the rotational shaft 106A around its rotational axis.

With this configuration, when the belt unit 91 is mounted in the main casing 2, the left-to-right center part of the U-shaped hooking part 93 is brought into abutment contact with the tip end of the engaging lever 106 from the front, and the coil spring 54 is brought into the extended state. By the restoring force of the extended coil spring 54, the belt supporting roller 37 is urged in the direction to separate away from the belt supporting roller 36 (forward direction), thereby applying tension to the transfer belt 38.

With this configuration, since the one coil spring 54 urges the both longitudinal ends of the shafts of the belt supporting roller 37, the urging force can be equally applied to the both longitudinal ends of the belt supporting roller 37.

Figure 18:
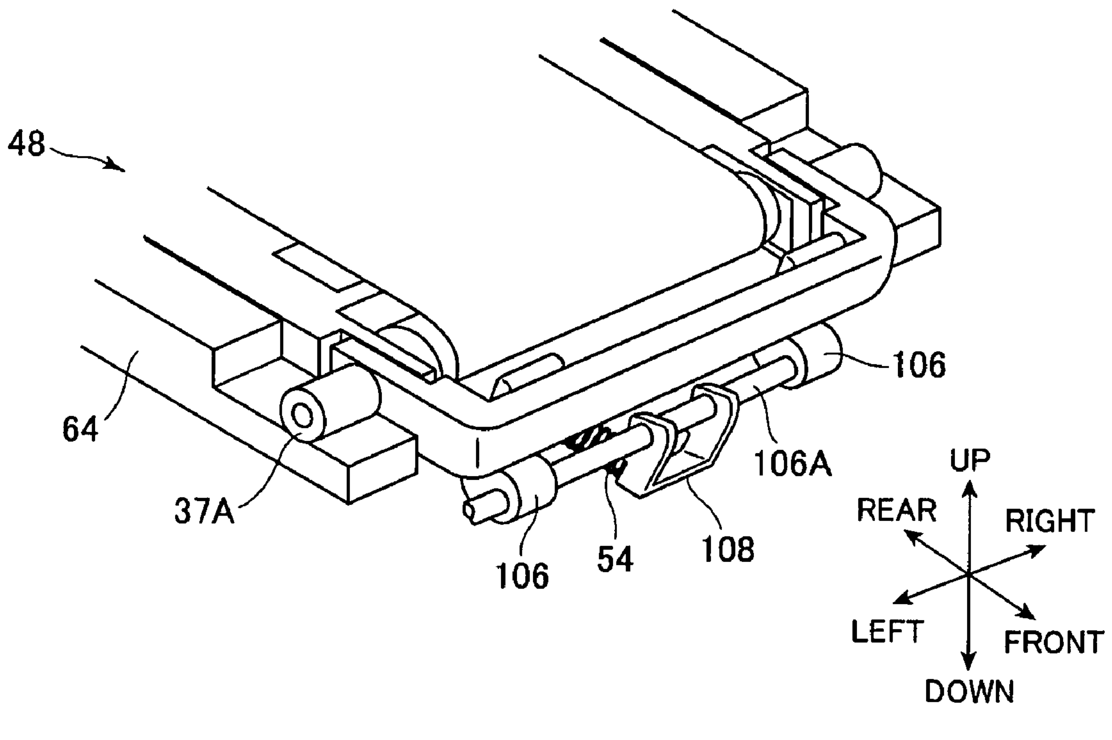
FIG. 18 illustrates how a belt unit is mounted in the belt unit storing part of the main casing according to a modification of the third embodiment.

It is noted that instead of providing only one engaging lever 106 confronting the right-to-left center of the U-shaped hooking part 93, a pair of engaging levers 106 may be provided confronting a pair of right-to-left side edges of the U-shaped hooking part 93 as shown in FIG. 18. The urging force originated from the single coil spring 54 can be applied equally to the longitudinal ends of the belt supporting roller 37 via the pair of engaging levers 106.

Fourth Embodiment

Figure 19:
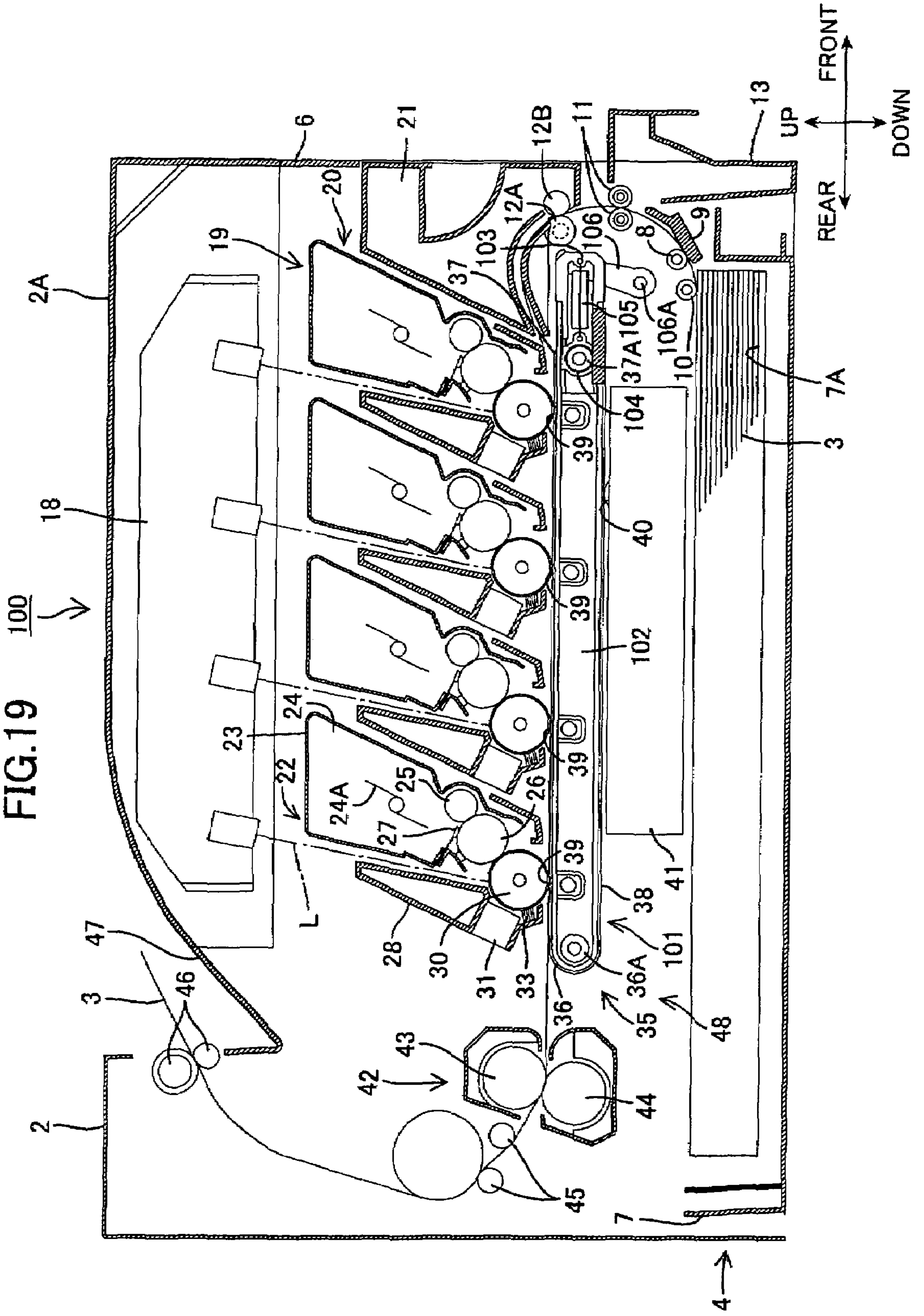
FIG. 19 is a side cross-sectional view of a laser printer according to a third embodiment.
Figure 20:
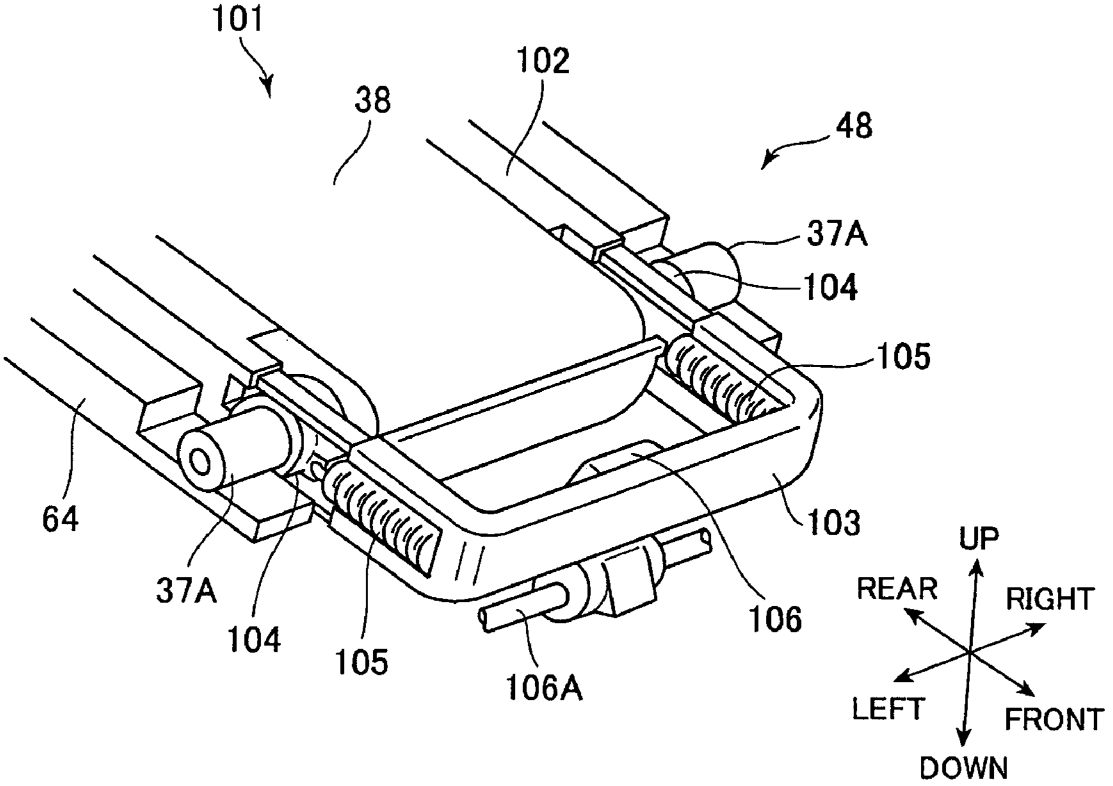
FIG. 20 illustrates how a belt unit is mounted in the belt unit storing part of the main casing according to the fourth embodiment.

A fourth embodiment will be described with reference to FIG. 19 and FIG. 20.

A laser printer 100 according to this embodiment is the same as the laser printer 1 of the first embodiment except for the points described below.

A belt unit 101 is provided in the laser printer 100 instead of the belt unit 50 in the third embodiment. The belt unit 101 is the same as the belt unit 50 except that the belt unit 101 has a frame 102 and a U-shaped sliding member 103 as shown in FIG. 20.

The frame 102 is the same as the frame 51 in the first embodiment except that the bearings 37A of the belt supporting roller 37 are supported on the frame 102 via a pair of sliding bearing members 104 instead of the pair of sliding bearing members 52 in the first embodiment. The sliding member 103 is slidably mounted on the front end of the frame 102. Thus, the sliding member 103 is located in front of the belt supporting roller 37, with its pair of opposite side portions being located in front of the pair of sliding bearing members 104. A pair of coil springs 105 are mounted on the frame 102 as being interposed between the pair of sliding bearing members 104 and the sliding member 103. The rear ends of the coil springs 105 are connected to the sliding bearing members 104, while the front ends of the coil springs 105 are connected to the sliding member 103. The sliding member 103 and the sliding bearing members 104 can slide with respect to the frame 102 in the front-to-rear direction.

Contrarily to the first embodiment, the coil springs 54 are not provided in the main casing 2, but the single engaging lever 106 is provided in the main casing 2 similarly to the third embodiment. That is, the engaging lever 106 is mounted on the rotational shaft 106A, which is rotatably supported in the main casing 2 similarly to the third embodiment. The engaging lever 106 is mounted on the rotational shaft 106A at such a position that the engaging lever 106 confronts the left-to-right center of the sliding member 103 when the belt unit 101 is mounted in the main casing 2. The base end of the engaging lever 106 is fixedly attached on the rotational shaft 106A. The tip end of the engaging lever 106 pivots around the rotational axis of the rotational shaft 106A when the rotational shaft 106A rotates around its rotational axis. Accordingly, the coil springs 105 are resiliently extended in accordance with the rotation of the rotational shaft 106A around its rotational axis.

With this configuration, the engaging lever 106 can be selectively brought into: a tension-applying attitude in which the engaging lever 106 urges the sliding member 103 forward and applies the tension caused by the extension of the coil springs 105 to the transfer belt 38; or a release attitude in which the engaging lever 106 retracts backward to separate away from the sliding member 103 and therefore applies no tension to the transfer belt 38.

More specifically, when the engaging lever 106 is in the tension-applying attitude, the tip end of the engaging lever 106 is brought into abutment contact with the sliding member 103 at its left-to-right center part from behind, and the coil springs 105 are brought into the extended state. By the restoring force of the extended coil springs 105, the belt supporting roller 37 is urged in the direction to separate away from the belt supporting roller 36 (forward direction) and is pressed against the inner circumference surface of the transfer belt 38, thereby applying tension to the transfer belt 38.

With this configuration, merely by pivoting the engaging lever 106, it is possible to easily switch between the tension-applying state for the transfer belt 38 and the releasing state.

Figure 21:
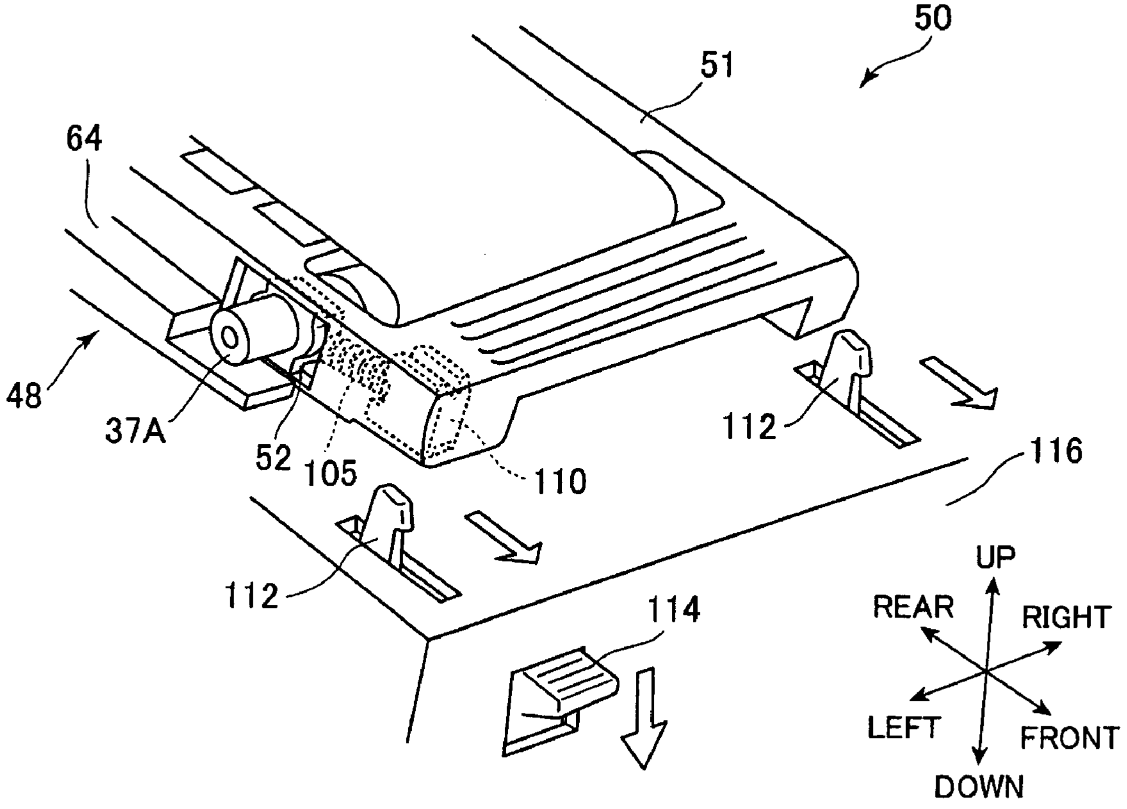
FIG. 21 illustrates how a belt unit is mounted in the belt unit storing part of the main casing according to a modification.

It is noted that the frame 51 in the belt unit 50 of the first embodiment may be modified as shown in FIG. 21 to install the pair of coil springs 105 therein. Only one (left-side one) of the pair of coil springs 105 is shown in FIG. 21. In this case, the rear end of each coil spring 105 is connected to the corresponding sliding bearing member 52 that supports the corresponding bearing 37A of the belt supporting roller 37. A pair of engagement members 110 are further mounted in the frame 51. The engagement members 110 are fixedly secured in the frame 51. The front end of each coil spring 105 is connected to the corresponding engagement member 110.

A pair of engaging members 112 and a lever 114 are provided on a belt unit mounting stand 116 that is provided inside the main casing 2 at the belt unit storing part 48. The user can access the lever 114 when the user opens the upper cover 2A to attach or detach the belt unit 50 into or from the main casing 2. The engaging members 112 are connected to the lever 114.

When the belt unit 50 having the thus modified frame 51 is mounted in the main casing 2, the pair of engagement members 110 are engaged with the pair of engaging members 112. After mounting the belt unit 50 in the main casing 2, the user presses down the lever 114. As a result, the engaging members 112 move the engagement members 110 forwardly, thereby pulling the sliding bearing members 52 forwardly while causing the coil springs 105 to be extended. The restoring force of the coil springs 105 are applied to the transfer belt 38.

While the invention has been described in detail with reference to the above aspects thereof, it would be apparent to those skilled in the art that various changes and modifications may be made therein without departing from the spirit of the invention.

For example, the configurations of the belt units in the third and fourth embodiments may be applied to an intermediate transfer tandem color laser printer as in the second embodiment.

Although the above-described laser printers are of a tandem type, in which a photosensitive drum is provided for each developing unit, the laser printers may be modified into laser printers of a four cycle-type, in which only a single photosensitive drum is provided in common to all the four developing units.

The color laser printers in the above-described embodiments may be modified to monochrome or other types of laser printers, in which a transfer belt or an intermediate transfer belt is provided.

The laser printers of the above-described embodiments may be modified into other types of printers, facsimile machines, multi-function devices having a printing function and reading function (scanning function), and the like that employ endless belts for printing.

In the above description, each of the belts 38 and 71 is made of elastomer. However, each of the belts 38 and 71 may be made of other kinds of material that preferably has a linear expansion coefficient of about 0.00015 cm/cm/° C. or more.

What is claimed is:

1. An image forming device, comprising:

a main unit;

an image bearing body which bears a developer image thereon and which is provided in the main unit;

a belt unit detachably mounted in the main unit and having a pair of supporting rollers supporting an endless belt thereon, the endless belt having an inner circumference side that confronts the pair of supporting rollers and an outer circumference side opposite to the inner circumference side, the outer circumference side of a part of the endless belt defined between the pair of supporting rollers along an arrangement direction, in which the pair of supporting rollers are arranged, confronting the image bearing body when the belt unit is mounted in the main unit; and a tension-applying mechanism that is provided in the main unit and that, when the belt unit is mounted in the main unit, urges one supporting roller among the pair of supporting rollers in a direction of separating the one supporting roller away from the other supporting roller, thereby applying tension to the endless belt.

2. An image forming device as claimed in claim 1, wherein the tension-applying mechanism includes:

a coil spring which has a pair of opposite ends, one end among the pair of opposite ends being fixed to the main unit; and an engaging part connected to the other end among the pair of opposite ends of the coil spring, and wherein when the belt unit is mounted in the main unit, the rotational shaft of the one supporting roller engages with the engaging part and extends the coil spring.

3. An image forming device as claimed in claim 1, wherein the belt unit includes:

a pair of attachment parts which rotatably support a pair of opposite ends of a rotational shaft of the one supporting roller;

a connecting part that is elongated to connect the pair of attachment parts with each other, and wherein the tension-applying mechanism includes:

an urging spring having a pair of opposite ends, one end of which is connected to the main unit; and an engaging part connected to the other end among the pair of opposite ends of the urging spring, and wherein when the belt unit is mounted in the main unit, the longitudinal center of the connecting part engages with the engaging part and elastically deforms the urging spring.

4. An image forming device as claimed in claim 1, wherein the endless belt has a linear expansion coefficient of 0.00015 cm/cm/° C. or greater.

5. An image forming device, comprising:

a main unit;

an image bearing body which bears a developer image thereon and which is provided in the main unit;

a belt unit detachably mounted in the main unit and having a first supporting roller, a second supporting roller, and at least one third supporting roller supporting an endless belt thereon, the at least one third supporting roller being located at a position that is separate from an imaginary plane, on which the first and second supporting rollers are located, in a direction perpendicular to the imaginary plane, the endless belt having an inner circumference side that confronts the first supporting roller, the second supporting roller, and the at least one third supporting roller and an outer circumference side opposite to the inner circumference side, the outer circumference side of a part of the endless belt defined between the first supporting roller and the second supporting roller along an arrangement direction, in which the first supporting roller and the second supporting roller are arranged, confronting the image bearing body when the belt unit is mounted in the main unit; and a tension-applying mechanism that is provided in the main unit and that, when the belt unit is mounted in the main unit, urges one supporting roller among the first supporting roller and the second supporting roller in a direction of separating the one supporting roller away from the other supporting roller among the first supporting roller and the second supporting roller, thereby applying tension to the endless belt.

6. An image forming device as claimed in claim 5, wherein the tension-applying mechanism includes:

a coil spring which has a pair of opposite ends, one end among the pair of opposite ends being fixed to the main unit; and an engaging part connected to the other end among the pair of opposite ends of the coil spring, and wherein when the belt unit is mounted in the main unit, the rotational shaft of the one supporting roller engages with the engaging part and extends the coil spring.

7. An image forming device as claimed in claim 5, wherein the belt unit includes:

a pair of attachment parts which rotatably support a pair of opposite ends of a rotational shaft of the one supporting roller;

a connecting part that is elongated to connect the pair of attachment parts with each other, and wherein the tension-applying mechanism includes:

an urging spring having a pair of opposite ends, one end of which is connected to the main unit; and an engaging part connected to the other end among the pair of opposite ends of the urging spring, and wherein when the belt unit is mounted in the main unit, the longitudinal center of the connecting part engages with the engaging part and elastically deforms the urging spring.

8. An image forming device as claimed in claim 5, wherein the endless belt has a linear expansion coefficient of 0.00015 cm/cm/° C. or greater.

9. An image forming device, comprising:

a main unit;

a belt unit detachably mounted in the main unit and having a plurality of supporting rollers supporting an endless belt thereon, the endless belt having an inner circumference side that confronts the pair of supporting rollers, the belt unit farther having an engagement part and a spring member, the spring member being connected to one supporting roller among the plurality of supporting rollers at its one end and being connected to the engagement part at its other end; and an engaging member that is provided in the main unit and that engages with the engagement part and presses the one supporting roller against the inner circumference side of the endless belt via the spring member when the belt unit is mounted in the main unit.

10. A belt unit detachably mountable in an image forming device, the belt unit comprising:

a frame that is configured so as to be capable of being detachably mounted in a main unit of an image forming device;

a plurality of supporting rollers rotatably supported on the frame and supporting an endless belt thereon, the endless belt having an inner circumference side that confronts the pair of supporting rollers;

a spring member which is connected to one supporting roller among the plurality of supporting rollers at its one end; and an engagement part which is connected to the other end of the spring member, the engagement part being configured to engage with an engaging member provided in the main unit of the image forming device and to press the one supporting roller against the inner circumference side of the endless belt via the spring member when the belt unit is mounted in the main unit of the image forming device.

* * * * *